(12) United States Patent
Garthwaite

(10) Patent No.: US 7,096,238 B2
(45) Date of Patent: Aug. 22, 2006

(54) DYNAMIC FEEDBACK FOR DETERMINING COLLECTION-SET SIZE

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 644 days.

(21) Appl. No.: 10/313,256

(22) Filed: Dec. 6, 2002

(65) Prior Publication Data

US 2004/0111448 A1 Jun. 10, 2004

Related U.S. Application Data

(63) Continuation-in-part of application No. 10/175,765, filed on Jun. 20, 2002, now abandoned, which is a continuation of application No. 09/377,349, filed on Aug. 19, 1999, now Pat. No. 6,434,576.

(51) Int. Cl.
G06F 12/00 (2006.01)
G06F 17/30 (2006.01)

(52) U.S. Cl. ..................... 707/205; 707/206; 711/159

(58) Field of Classification Search ............ 707/103 R, 707/200, 205, 206; 711/6, 159, 160, 165
See application file for complete search history.

(56) References Cited

U.S. PATENT DOCUMENTS

| | | | |
|---|---|---|---|
| 4,724,521 A | 2/1988 | Carron et al. | |
| 4,797,810 A * | 1/1989 | McEntee et al. | ............ 707/206 |
| 4,912,629 A | 3/1990 | Shuler, Jr. | |
| 4,989,134 A | 1/1991 | Shaw | |
| 5,088,036 A | 2/1992 | Ellis et al. | |
| 5,333,318 A | 7/1994 | Wolf | |
| 5,392,432 A | 2/1995 | Engelstad et al. | |
| 5,485,613 A | 1/1996 | Engelstad et al. | |
| 5,560,003 A | 9/1996 | Nilson et al. | |
| 5,687,370 A | 11/1997 | Garst et al. | |
| 5,801,943 A | 9/1998 | Nasburg | |
| 5,845,278 A | 12/1998 | Kirsch et al. | |
| 5,845,298 A | 12/1998 | O'Connor et al. | |
| 5,857,210 A | 1/1999 | Tremblay et al. | |
| 5,873,104 A * | 2/1999 | Tremblay et al. | ........... 707/206 |
| 5,873,105 A | 2/1999 | Tremblay et al. | |
| 5,900,001 A | 5/1999 | Wolczko et al. | |
| 5,903,900 A | 5/1999 | Knippel et al. | |
| 5,930,807 A | 7/1999 | Ebrahim et al. | |

(Continued)

FOREIGN PATENT DOCUMENTS

EP 0 904 055 A1 9/1999

(Continued)

OTHER PUBLICATIONS

Jones and Lins, "Garbage Collection: Algorithms for Automatic Dynamic Memory Management," 1996, pp. 165-179, Wiley, New York.

(Continued)

Primary Examiner—Greta Robinson
Assistant Examiner—Jacques Veillard
(74) Attorney, Agent, or Firm—Kudirka & Jobse, LLP

(57) ABSTRACT

A garbage collector collects a generation of a dynamically allocated heap in a computer's memory incrementally. A collection set within the generation is associated with each collection increment. The collector reclaims for reuse the memory space occupied by any collection-set object not reachable by a reference chain that extends from outside the collection set. The collector monitors the total amount of allocation that occurs within the generation between collection increments, and it bases the collection-set size on those allocation amounts.

25 Claims, 25 Drawing Sheets

U.S. PATENT DOCUMENTS

| | | | |
|---|---|---|---|
| 5,953,736 | A | 9/1999 | O'Connor et al. |
| 5,960,087 | A * | 9/1999 | Tribble et al. ............... 713/167 |
| 5,999,974 | A | 12/1999 | Ratcliff et al. |
| 6,021,415 | A | 2/2000 | Cannon et al. |
| 6,047,125 | A | 4/2000 | Agesen et al. |
| 6,049,390 | A | 4/2000 | Notredame et al. |
| 6,049,810 | A | 4/2000 | Schwartz et al. |
| 6,065,020 | A | 5/2000 | Dussud |
| 6,098,089 | A | 8/2000 | O'Connor et al. |
| 6,148,309 | A | 11/2000 | Azagury et al. |
| 6,148,310 | A * | 11/2000 | Azagury et al. ............ 707/206 |
| 6,173,294 | B1 | 1/2001 | Azagury et al. |
| 6,185,581 | B1 | 2/2001 | Garthwaite |
| 6,226,653 | B1 | 5/2001 | Alpern et al. |
| 6,243,720 | B1 | 6/2001 | Munter et al. |
| 6,260,120 | B1 | 7/2001 | Blumenau et al. |
| 6,289,358 | B1 | 9/2001 | Mattis et al. |
| 6,308,185 | B1 | 10/2001 | Grarup et al. |
| 6,314,436 | B1 | 11/2001 | Houldsworth |
| 6,321,240 | B1 | 11/2001 | Chilimbi et al. |
| 6,353,838 | B1 * | 3/2002 | Sauntry et al. ............. 707/206 |
| 6,381,738 | B1 | 4/2002 | Choi et al. |
| 6,393,439 | B1 | 5/2002 | Houldsworth et al. |
| 6,415,302 | B1 | 7/2002 | Garthwaite et al. |
| 6,424,977 | B1 | 7/2002 | Garthwaite |
| 6,434,576 | B1 | 8/2002 | Garthwaite |
| 6,434,577 | B1 | 8/2002 | Garthwaite |
| 6,442,661 | B1 | 8/2002 | Dreszer |
| 6,449,626 | B1 | 9/2002 | Garthwaite et al. |
| 6,496,871 | B1 | 12/2002 | Jagannathan et al. |
| 6,529,919 | B1 | 3/2003 | Agesen et al. |
| 6,567,905 | B1 | 5/2003 | Otis |
| 6,640,278 | B1 | 10/2003 | Nolan et al. |
| 6,757,890 | B1 | 6/2004 | Wallman |
| 6,769,004 | B1 | 7/2004 | Barrett |
| 6,820,101 | B1 | 11/2004 | Wallman |
| 6,826,583 | B1 | 11/2004 | Flood et al. |
| 6,868,488 | B1 | 3/2005 | Garthwaite |
| 6,892,212 | B1 | 5/2005 | Shuf et al. |
| 6,928,460 | B1 * | 8/2005 | Nagarajan et al. .......... 707/206 |
| 6,931,423 | B1 | 8/2005 | Sexton et al. |
| 2002/0032719 | A1 | 3/2002 | Thomas et al. |
| 2002/0095453 | A1 | 7/2002 | Steensgaard |
| 2002/0133533 | A1 | 9/2002 | Czajkowski et al. |
| 2002/0138506 | A1 | 9/2002 | Shuf et al. |
| 2003/0088658 | A1 | 5/2003 | Davies et al. |
| 2003/0200392 | A1 | 10/2003 | Wright et al. |
| 2003/0217027 | A1 | 11/2003 | Farber et al. |
| 2004/0010586 | A1 | 1/2004 | Burton et al. |
| 2004/0039759 | A1 | 2/2004 | Detlefs et al. |
| 2004/0215914 | A1 | 10/2004 | Dussud |

FOREIGN PATENT DOCUMENTS

| | | |
|---|---|---|
| EP | 0 969 377 A1 | 1/2000 |
| WO | WO0188713 A2 | 11/2001 |

OTHER PUBLICATIONS

Paul Wilson, "Uniprocessor Garbage Collection Techniques," Technical Report, University of Texas, 1994.

Hudson and Moss, "incremental Collection of Mature Objects," Proceedings of International Workshop on Memory Management, 1992, Springer-Verlag.

Grarup and Seligmann, "Incremental Mature Garbage Collection," M.Sc. Thesis, Available at http://www.daimi.au.dk/~jacobse/Papers/.

Seligmann and Grarup, "Incremental Mature Garbage Collection Using the Train Algorithm," Proceedings of ECOOP '95, Ninth European Conference on Object-Oriented Programming, 1995, http://www.daimi.au.dk/~jacobse/Papers/.

Clark and Mason, "Compacting Garbage Collection can be Fast and Simple," Software—Practice and Experience, Feb. 1996, pp. 177-194, vol. 26, No. 2.

Henry Baker, "List Processing in Real Time on a Serial Computer," Communications of the ACM 21, 4, Apr. 1978, pp. 280-294.

Appel, Ellis, and Li, "Real-time Concurrent Collection on Stock Multiprocessors," ACM SIGPLAN Notices, 1988.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984. Austin, Texas.

Herlihy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective Static-Graph Reorganization to Improve Locality in Garbage Collected Systems," Proceedings of ACM SIGPLAN Conference on Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 404-425.

Chilimbi and Larus, "Using Generational Garbage Collection to Implement Cache-Conscious Data Placement," International Symposium on Memory Management, Oct. 1998.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience , 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul.

Hudson and Hosking, "Remembered sets can also play cards," in OOPSLA/ECOOP Workshop on Garbage Collection in Object-Oriented Systems, Oct. 1993, Edited by Moss, Wilson, and Zorn.

Hosking and Moss, "Protection traps and alternatives for memory management of an object-orienced language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988.

U.S. Appl. No. 10/287,851, filed Nov. 5, 2002, Garthwaite et al.

Appleby, Karen, "Garbage Collection for Prolog Based on WAM, vol. 31, Issue 6", Communication of the ACM, Jun. 1, 1998, 719-741.

Arora, et al., "Thread Scheduling for Multiprogrammed Multiprocessors", Proceedings of the 10th Annual ACM Symposium on Parallel Algorithms and Architecture, Jun. 1998.

Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.

Blackburn & McKinley, "In or Out? Putting Write Barriers in Their Place", Jun. 20, 2002, Berlin.

Clark, "An Efficient List-Moving Algorithm Using Constant Workspace, vol.19 No. 6", Communications of the ACM, Jun. 1976, 352-354.

Flood, et al., "Parallel Garbage Collection for Shared Memory Multiprocessors", USENIX JVM Conference, Apr. 2001.

Goldstein, et al., "Lazy Threads: Implementing a Fast Parallel Call, vol. 37, No. 1", Journal of Parallel and Distributed Computing, Aug. 1996, 5-20.

Hanson, "Fast Allocation and Deallocation of Memory Based on Object Lifetimes", Software Practice and Experience, Jan. 1990, 20(1):5-12.

Harris, "Dynamic Adaptive Pre-Tenuring", In Proceedings of the Int'l Symposium on Memory Management, Oct. 2000, 127-136.

Holzle, Urs, "A Fast Write Barrier for Generational Garbage Collectors", Workshop on Garbage Collection in Object Oriented Systmes, Oct. 1993.

Hudson, et al., "A Language-Independent Garbage Collector Toolkit", Coins Techincal Report, Sep. 1991.

Hudson, et al., "Training Distributed Garbage: The DMOS Collector", University of St. Andrews Tech Report, 1997, 1-26.

Hudson, et al., "Garbage Collecting the World: One Car at a Time", ACM SIGPLAN Notices 32, 1997, 162-175.

Hudson, et al., "Sapphire: Copying GC Without Stopping the World", Practice and Experience Special Issue, Date Unknown, JAVA/Grande/Iscope.

Liskov, et al., "Partitioned Garbage Collection of a Large Stable Heap", Proceedings of IWOOOS, 1996, 117-121.

Moss, et al., "A Complete and Coarse-Grained Incremental Garbage Collection for Persisten Object Strores", Proceedings 7th Int'l Workshop on Persisten Object System, 1996, 1-13, Cape May, NJ.

Munro, et al., "Incremental Garbage Collection of a Persistent Object Store using PMOS", 3rd Int'l Workshop on Persistence and Java, 1998, 78-91, Tiburon, California.

Nettles, Scott, "Real-Time Replication Garbage Collection", Avionics Lab, Wright Research and Development Center, 1993, PDDI.

Padopoulos, "Hood: A User-Level Thread Library for Multiprogramming Multiprocessors, Thesis: The Uni. of TX", University of Texas, Aug. 1998, 1-71, Austin.

Roy, et al., "Garbage Collection in Object-Oriented Databases Using Transactional Cyclic Reference Counting", VLDB Journal—The International Journal on Very Large Da Bases, vol. 7, Issue 3, 1998, 179-193.

Shuf, et al., "Exploiting Profilic Types for Memory Management and Optimizations. ACM ISBN 9/2/01", POPL, Jan. 2002, Portland.

Ungar, et al., "Tenuring Policies for Generation-Based Storage Reclamation", ACM SIGPLAN Notices, 1988, 23(11)1-17.

Venners, "Garbage Collection, Inside the Java 2 Virtual Machine; Chapter 9", www.artima.com, Date Unknown, parts 1-18.

Wilson, "Uniprocessor Garbage Collection Techniques", Proceedings of Int'l Workshop on Memory Management, 1992, V. 637.

Withington, P.T., "How Real is "Real-Time" GC?", Symbolics, Inc., Oct. 6, 1991, Burlington, MA.

Zee, et al., "Write Barrier Removal by Static Analysis", OOPSLA '02, Nov. 2002.

Zorn, "Segregating Heap Objects by Reference Behavior and Lifetime", In 8th Int'l Conferenceon Architectural Support for Programming Languages and Operating Systems, Oct. 1998, 12-32, San Jose, CA.

Zorn, Benjamin, "Barrier Methods for Garbage Collection", Dept. of Computer Science, Uni. of Colorado, Nov. 1990, 1-37, Boulder.

Azagury, et al., "Combining Card Marking With Remembered Sets: How to Save Scanning Time", ACM SIGPLAN Notices, Oct. 1998, V. 34(3), ACM Press, Vancouver, Canada.

Cheney, "A Nonrecursive List Compacting Algorithm, vol. 13, No. 11", Communications of the ACM, Nov. 1970, 677-678, Uni. Math. Lab., Cambridge, European Patent Office.

Cheng, et al., "Generational Stack Collection and Profile-Driven Pretenuring", SIGPLAN'98 Conference on Programming Languages Design and Implementation, Jun. 1998, 162-173, ACM Press, Montreal, Canada.

Lam, et al., "Effective Static-Graph Reorganization to Improve Locality in Garbage Collected Systems", Proceedings of ACM SIGPLAN Conference on Programming Language Design and Implementation, Jun. 1991, Toronto, Canada.

Pirinen, Pekka, "Barrier Techniques for Incremental Tracing", Harlequin Limited, Date Unknown, 20-25, Cambridge, Great Britain.

* cited by examiner

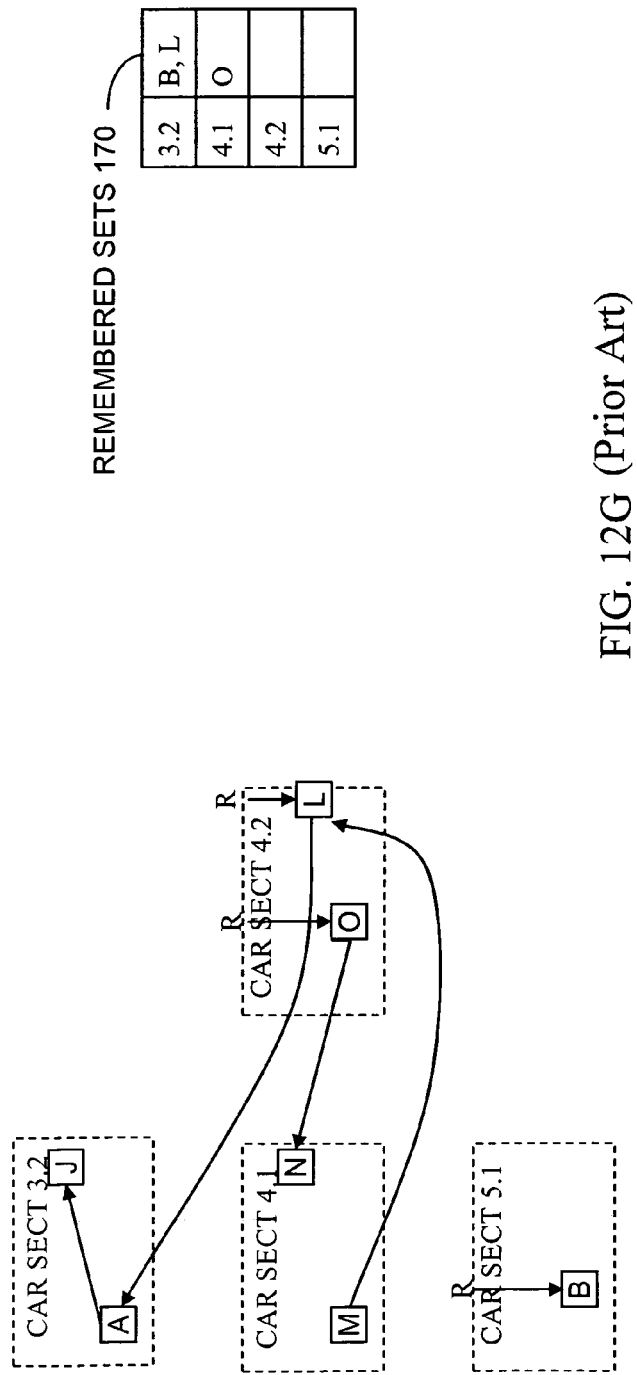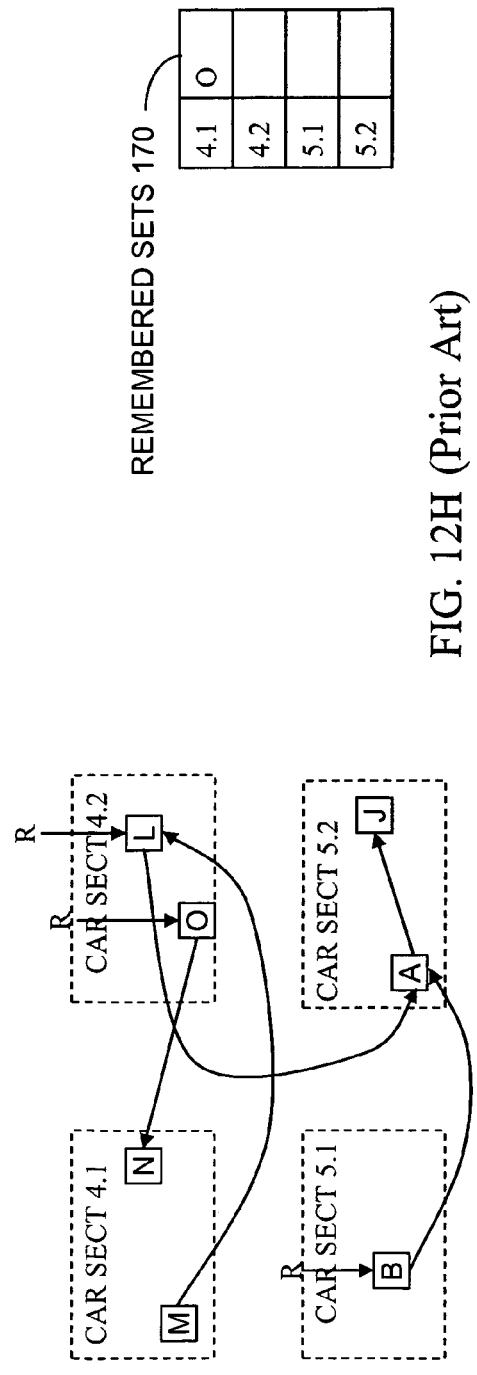
FIG. 12G (Prior Art)
FIG. 12H (Prior Art)

DYNAMIC FEEDBACK FOR DETERMINING COLLECTION-SET SIZE

CROSS-REFERENCE TO RELATED APPLICATIONS

This application is a continuation-in-part of commonly assigned U.S. patent application Ser. No. 10/175,765, which was filed on Jun. 20, 2002, by Alexander T. Garthwaite for a Garbage Collector Employing Multiple-Car Collection Sets, is hereby incorporated in its entirety by reference, and is in turn a continuation of commonly assigned U.S. patent application Ser. No. 09/377,349, which was filed on Aug. 19, 1999, by Alexander T. Garthwaite for Popular-Object Handling and has now issued as U.S. Pat. No. 6,434,576.

BACKGROUND OF THE INVENTION

1. Field of the Invention

The present invention is directed to garbage collection of dynamically allocated memory. It particularly concerns the rate at which garbage collection should occur.

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. We will refer to the just-in-time compiler and the interpreter together as "execution engines" since they are the methods by which byte code can be executed.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; the allocation of such objects must be mediated by the garbage collector.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The execution engines and the runtime system of a virtual machine are designed together so that the engines "know" what runtime-system procedures are available in the virtual machine (and on the target system if that system provides facilities that are directly usable by an executing virtual-machine program.) So, for example, the just-in-time compiler 29 may generate native code that includes calls to memory-allocation procedures provided by the virtual machine's runtime system. These allocation routines may in turn invoke garbage-collection routines of the runtime system when there is not enough memory available to satisfy an allocation. To represent this fact, FIG. 3 includes block 30 to show that the compiler's output makes calls to the runtime system as well as to the operating system 31, which consists of procedures that are similarly system-resident but are not compiler-dependent.

Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

The arrangement of FIG. 3 differs from FIG. 2 in that the compiler 23 for converting the human programmer's code does not contribute to providing the garbage-collection function; that results largely from the virtual machine 27's operation. Those skilled in that art will recognize that both of these organizations are merely exemplary, and many modern systems employ hybrid mechanisms, which partake of the characteristics of traditional compilers and traditional interpreters both.

The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations" although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection interval to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists of only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection interval. To illustrate how such updating and other collection operations may be carried out, FIG. 8 depicts an operational sequence in a system of the typical type mentioned above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 1A and 1B ("FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings indicate, the remembered set may similarly need to be updated even if the referred-to object is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

A question that arises in connection with incremental collection is what the rate is at which collection should occur. Too much collection can interfere unduly with mutator operation. Too little collection can result in the heap's being filled up. The latter result typically necessitates a whole-heap collection and, often, an unacceptably long interruption in the mutator's operation. Although the collection-rate question arises for all incremental collectors independently of whether they employ the train algorithm and, to some extent, independently of whether they collect by generations, generational train-algorithm collectors exemplify conventional approaches to the problem.

Consider such a collector that operates, in a "stop-the-world" manner, as was described above in connection with FIGS. 8A and 8B: the mutator is stopped until the collector has completed collecting a collection set. In a typical two-generation collector of this type, in which most objects are allocated in the young generation initially and the train algorithm is employed to manage the old generation, into which the survivors are later promoted, mutator execution is interrupted for a collector interval whenever the young generation has run out of free space or soon will. During the ensuing interval, the entire young generation is collected, as was explained above. In this sense, the allocation rate is what determines the collection rate.

As was also explained above, though, at least some collection intervals include collection not only of the young generation but also of a car section in the old generation. So the rate of old-generation collection must be decided separately. The basic approach described in the original train-algorithm paper (Hudson and Moss, "Incremental Collection of Mature Objects," 1992 *Proceedings of the International Workshop on Memory Management* 1992 (Springer-Verlag) is simply to have one partial old-generation collection for each complete young-generation collection. That is, every collection interval includes collection of the entire young generation and one car section of the old generation. The rate of old-generation collection per unit of allocation is therefore established by the relationship between the car-section and young-generation sizes.

But performance may be improved by having the rate of old-generation collection vary dynamically in accordance with run-time conditions. An approach suggested in an M. Sc thesis by Grarup and Seligmann, "Incremental Mature Garbage Collection," is therefore not to have a partial old-generation collection occur during every collection interval but rather to have one occur only during each $N^{th}$ collection interval, where N is a function of how much garbage recent old-generation collections found.

Another approach, the one used in the HotSpot Java Virtual Machine, is to vary N in accordance with how many bytes of object promotion have occurred during young-generation collections and to vary the size of the young generation in accordance with that amount, too. Specifically, a quantity M, which has a range of −2 to 4, is decremented during each collection interval in which objects that exceed some threshold number of bytes have been promoted. M is incremented in other intervals. If M>1, then a collection interval including old-generation collection occurs once every M collection intervals. If M≦1, old-generation collection occurs every collection interval. The size of the young generation is reduced to 1/(2−M) of its normal size if M<1. In an application in which more objects tend to be promoted into the old generation, therefore, the rate of old-generation collection is relatively high, whereas applications that have higher "infant mortality" and thus tend to promote objects into the old generation at a lower rate will have a rate of old-generation collection that is lower.

SUMMARY OF THE INVENTION

But I have recognized that collector performance can be improved if the incrementally collected generation's rate of collection is controlled by varying the collection-set size in accordance with the rate of allocation in that same generation. Preferably, the function used in arriving at the collection-set size involves taking an average of the amounts of allocation in that generation that have occurred between successive incremental collections. For example, a weighted combination of separate running averages for objects of sizes 0–64 kB, 64 kB–256 kB, 256 kB–1 MB, and over 1 MB may be taken over the last 32, 64, 128, and 256 collections, respectively.

The allocation-rate-based function used to determine collection-set size may additionally include other factors, such as the rate at which objects survive incremental collection. In train-algorithm-based collectors, the calculation may also take into account how far back in the train sequence, on average, are the cars to which evacuated objects are moved, and how large the old-generation cars' remembered sets tend to be.

BRIEF DESCRIPTION OF THE DRAWINGS

The invention description below refers to the accompanying drawings, of which:

FIGS. 12A–12J, discussed above, are diagrams that illustrate a collection scenario that can result from using the train algorithm;

DETAILED DESCRIPTION OF AN ILLUSTRATIVE EMBODIMENT

Figure 13A:
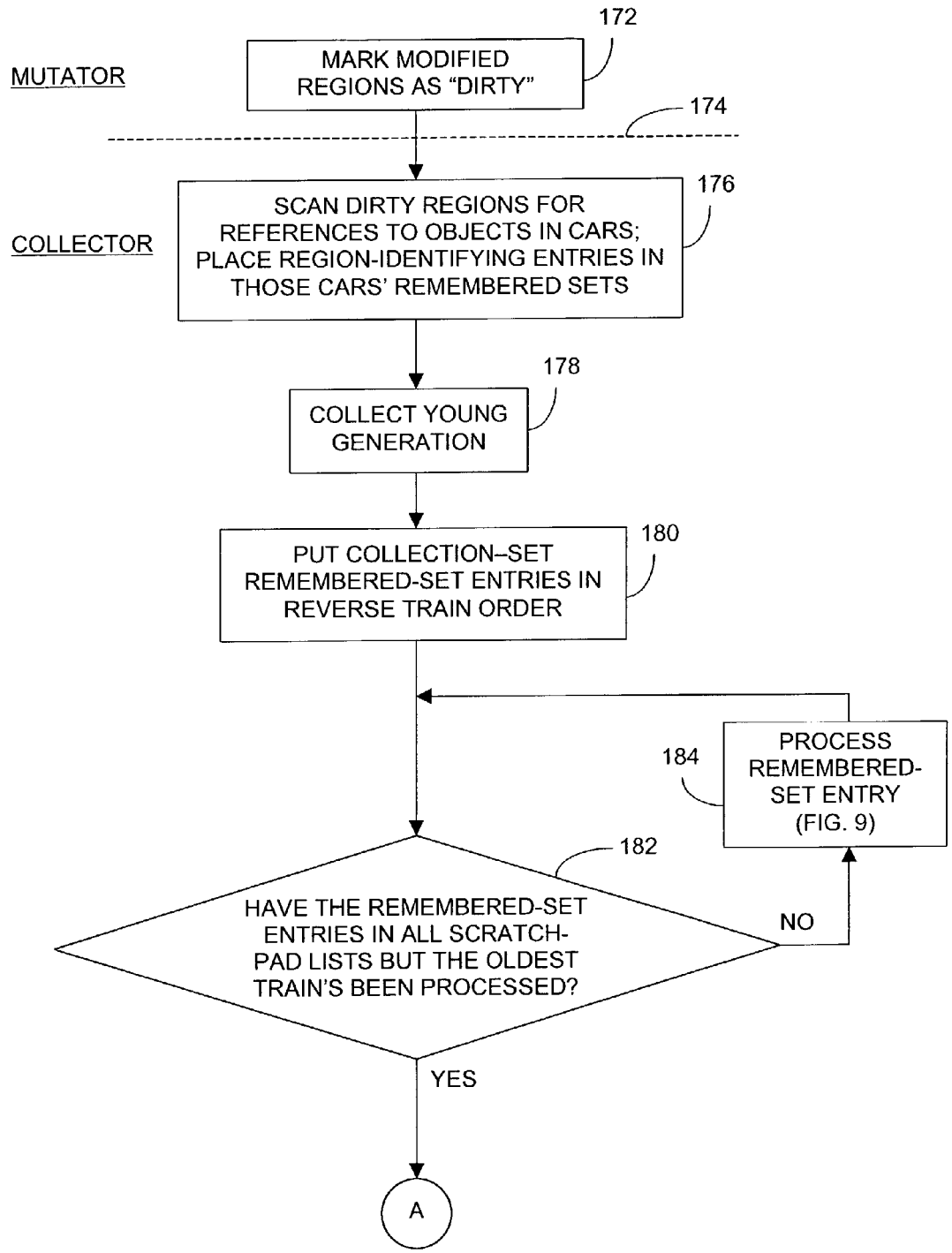
FIGS. 13A and 13B together constituted a flow chart that illustrates a collection interval, as FIGS. 8A and 8B do, but illustrates optimizations that FIGS. 8A and 8B do not include.
Figure 13B:
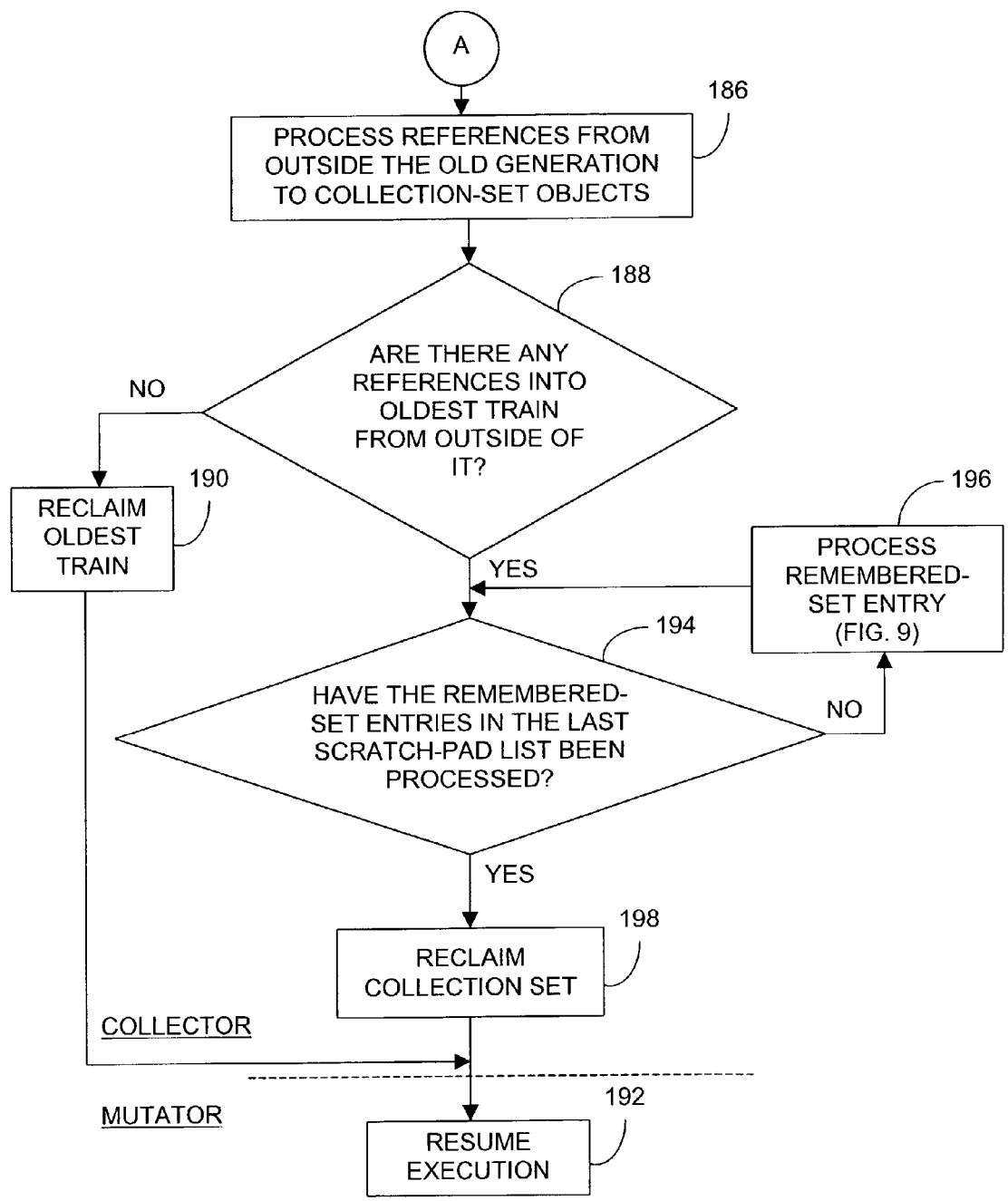

It will become apparent that the application's broader aspects are applicable to any incremental collector. However, I prefer to use it in a collector that treats the collected heap as divided into two generations and employs the train algorithm for the older generation. The way in which I use the train algorithm is similar to the conventional approach described above, but it includes some optimizations, as FIGS. 13A and 13B (together, "FIG. 13") show. And, whereas it was tacitly assumed in the train-algorithm discussion above that, as is conventional, only a single car section would be collected in any given collection increment, FIG. 13 reflects the possibility of multiple-car collection sets.

Figure 1:
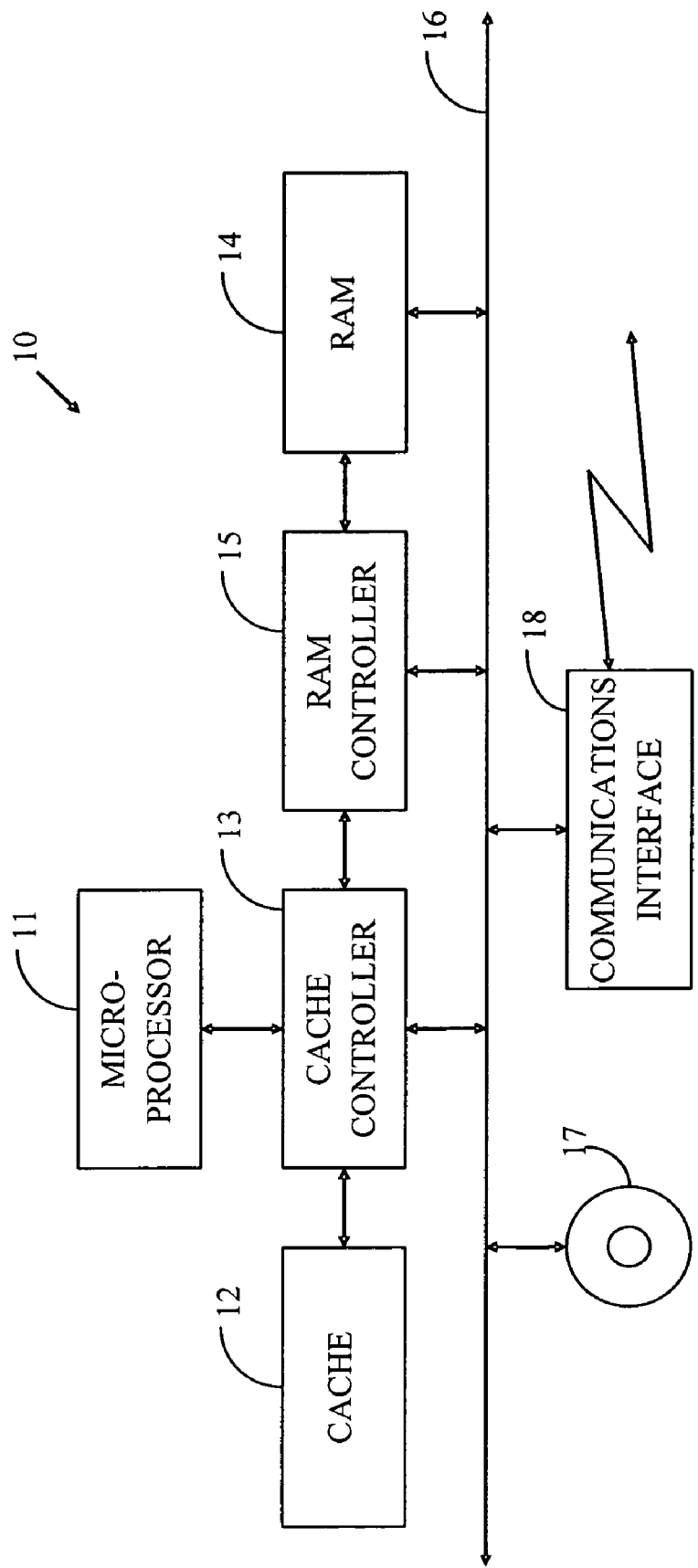
FIG. 1, discussed above, is a block diagram of a computer system in which the present invention's teachings can be practiced.
Figure 2:
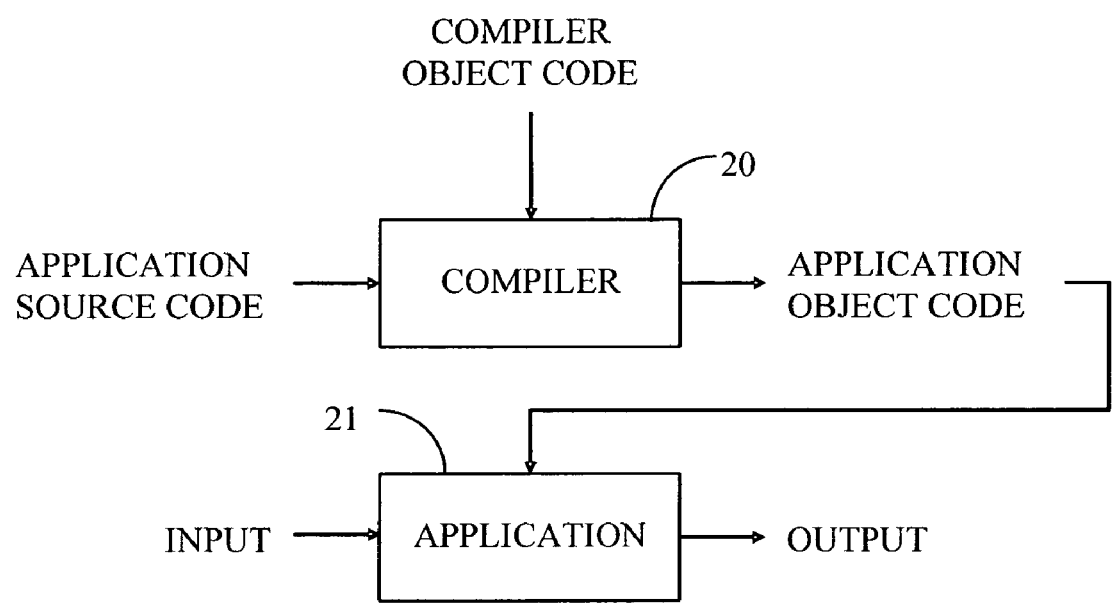
FIG. 2 is, discussed above, is a block diagram that illustrates a compiler's basic functions.
Figure 3:
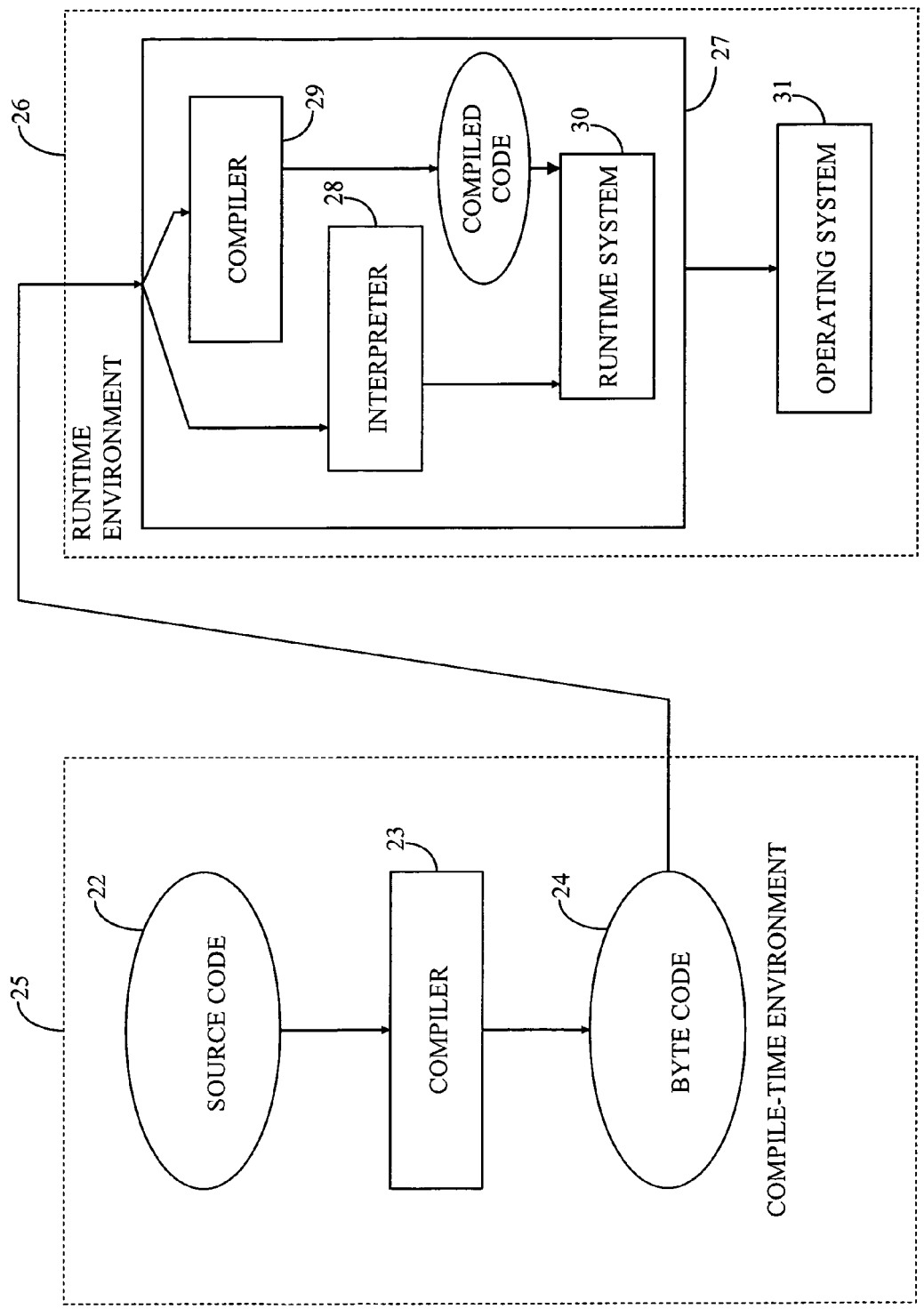
FIG. 3, discussed above, is a block diagram that illustrates a more-complicated compiler/interpreter organization.
Figure 4:
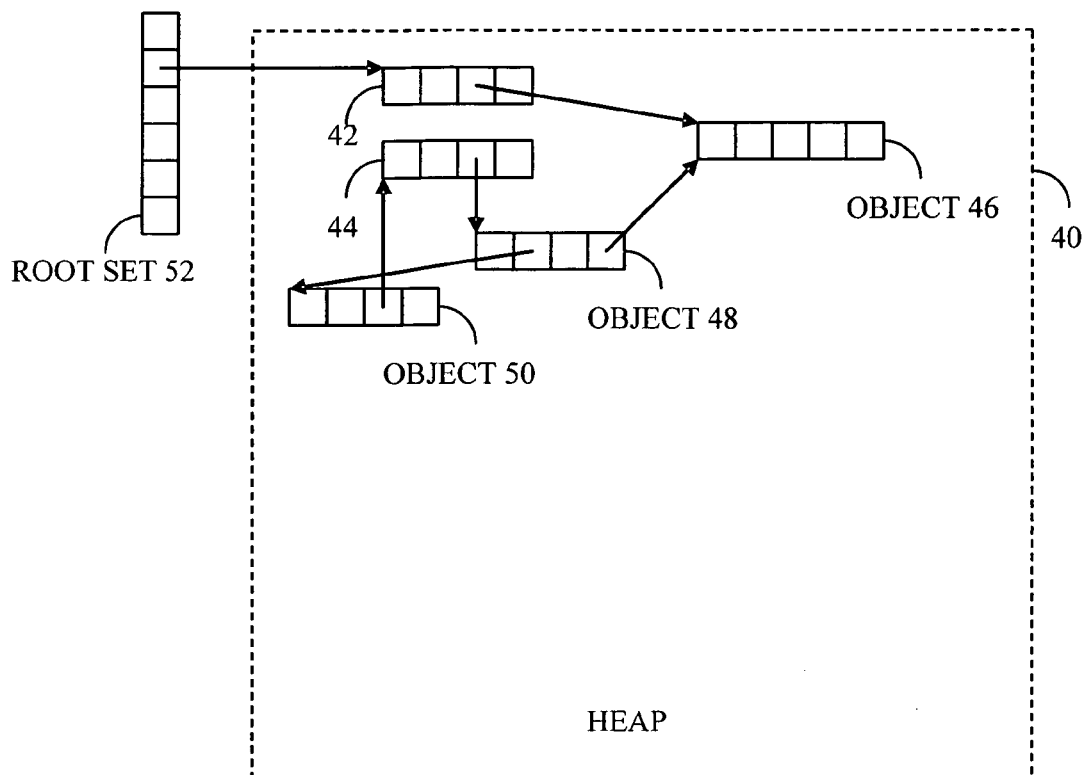
FIG. 4, discussed above, is a diagram that illustrates a basic garbage-collection mechanism.
Figure 5:
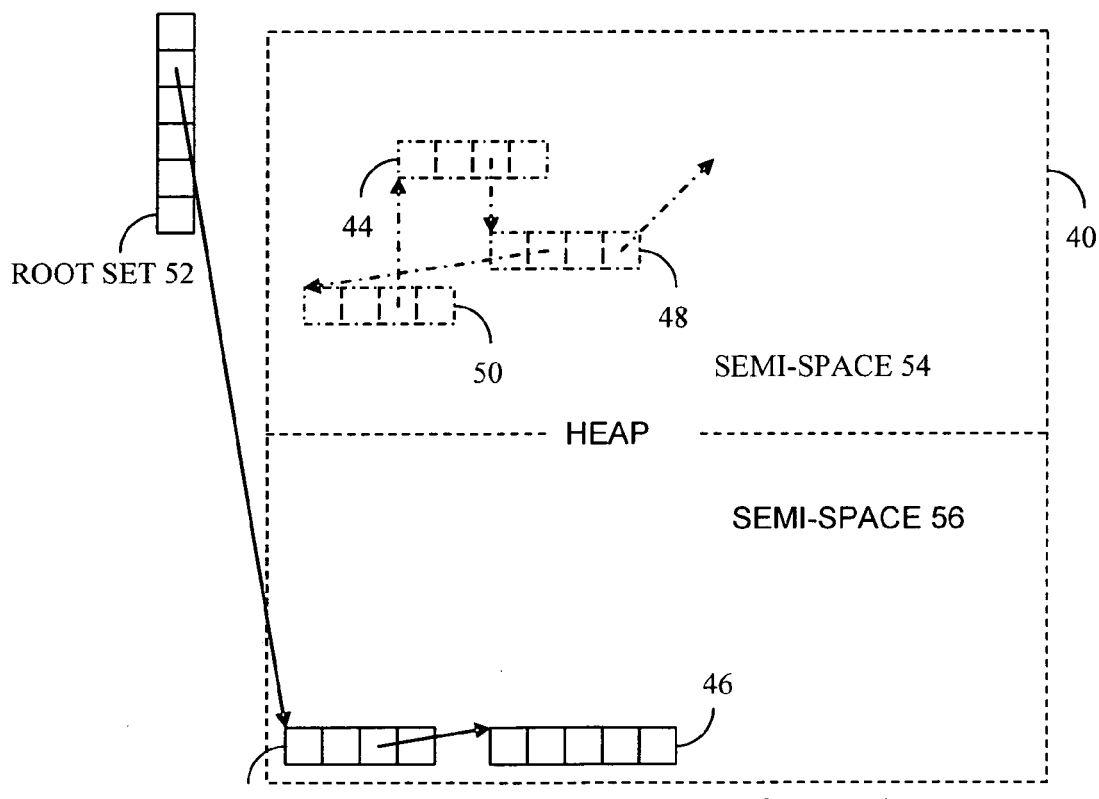
FIG. 5, discussed above, is a similar diagram illustrating that garbage-collection approach's relocation operation.
Figure 6:
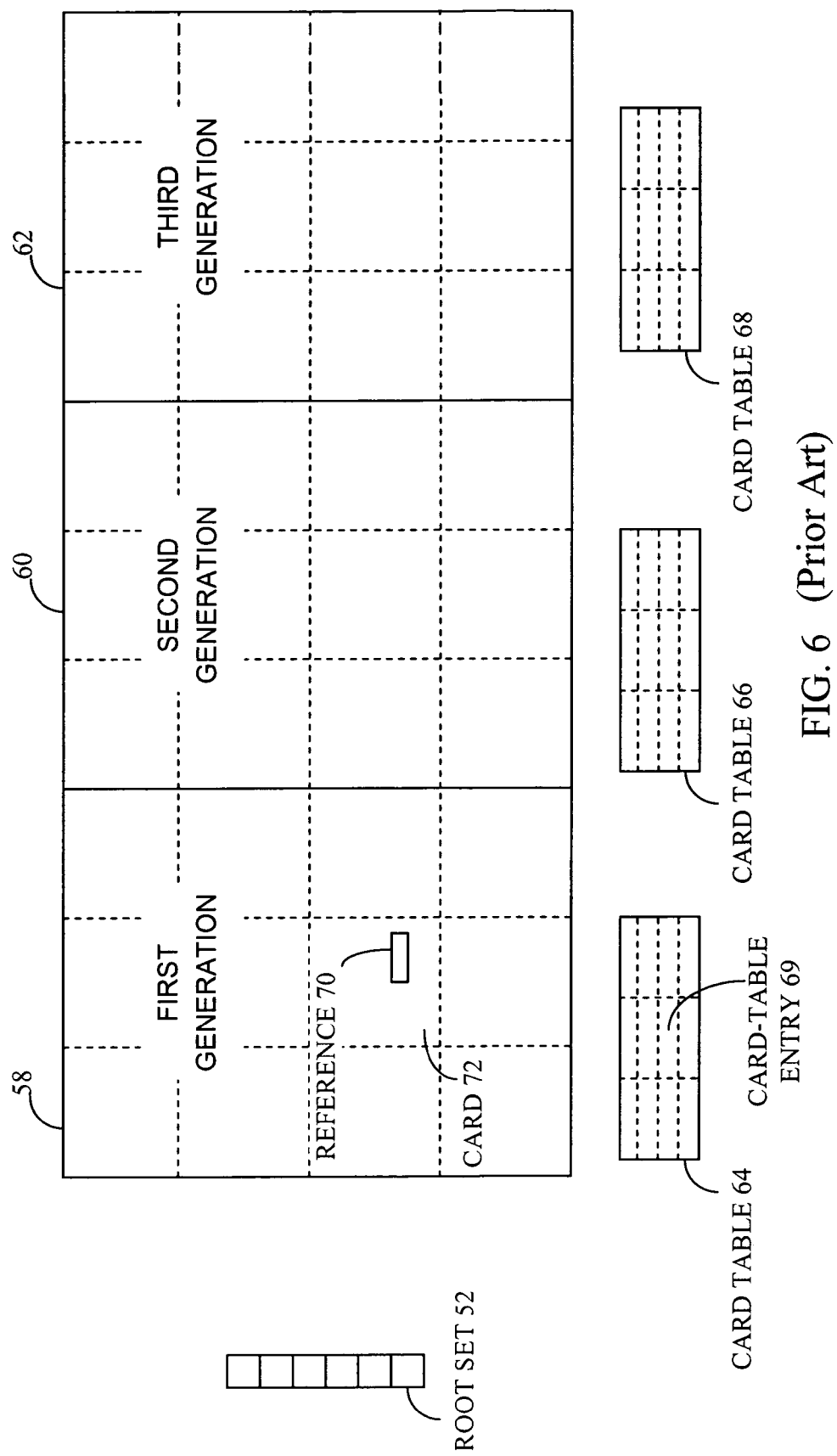
FIG. 6, discussed above, is a diagram that illustrates a garbage-collected heap's organization into generations.
Figure 7:
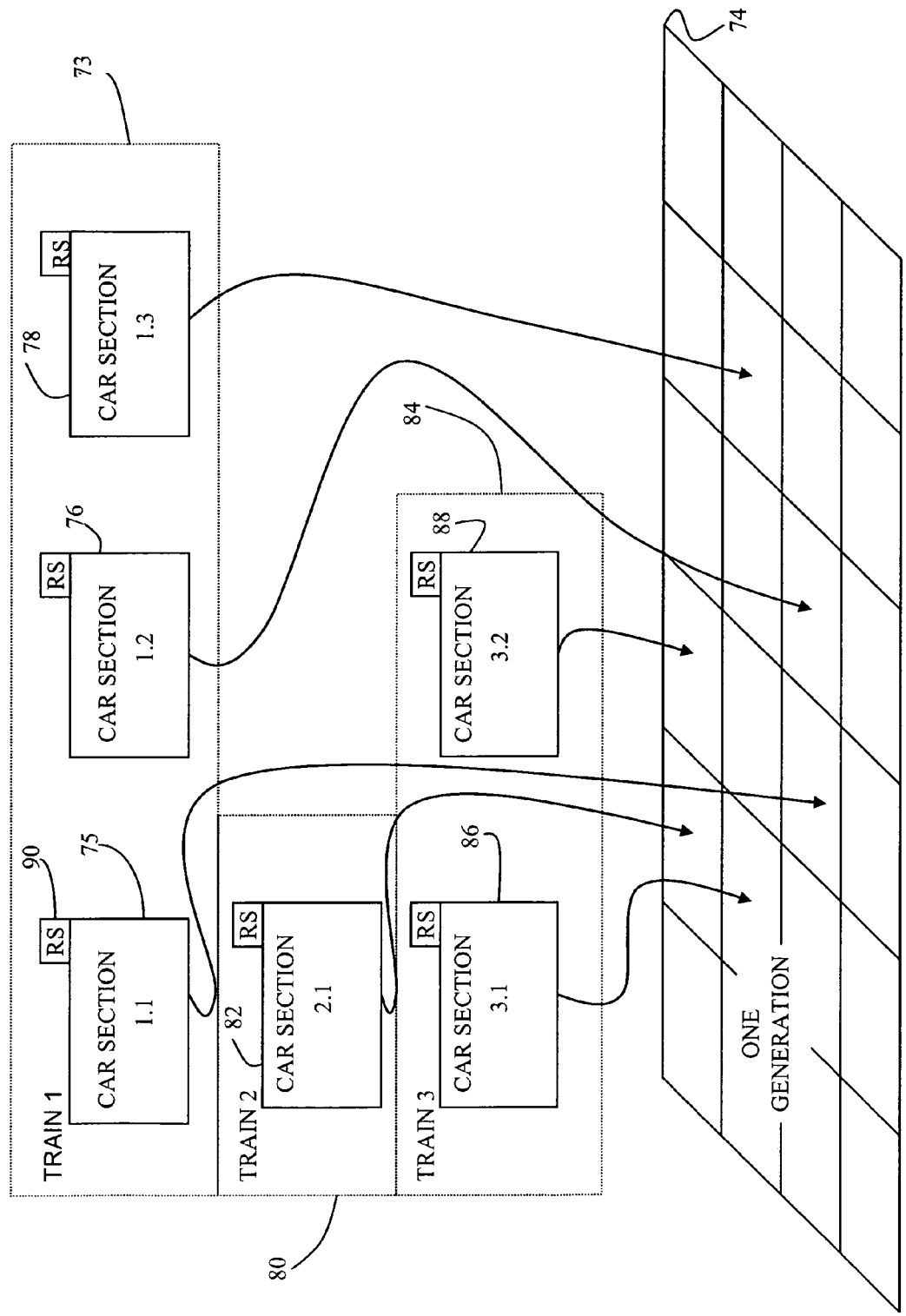
FIG. 7, discussed above, is a diagram that illustrates a generation organization employed for the train algorithm.
Figure 8A:
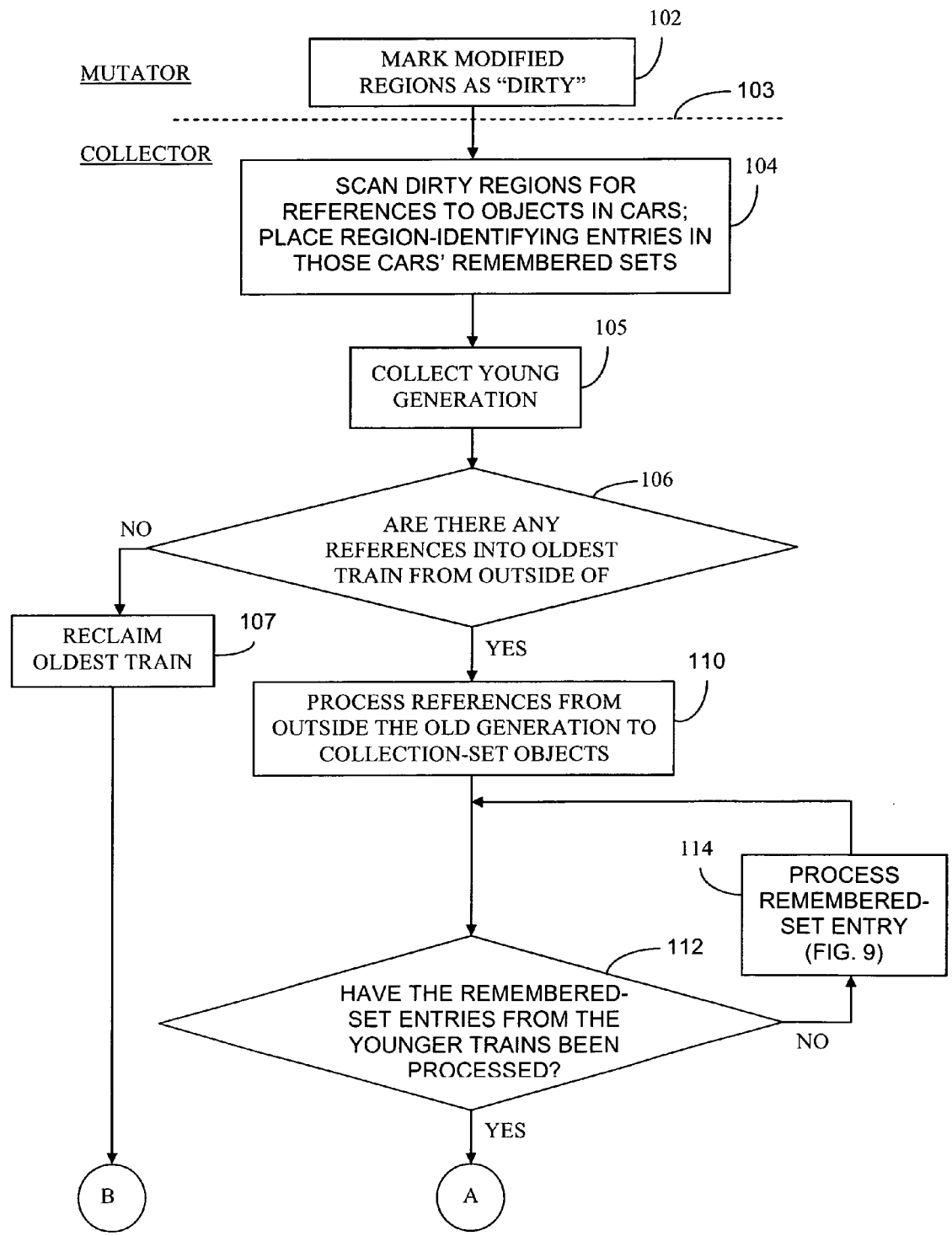
FIGS. 8A and 8B, discussed above, together constitute a flow chart that illustrates a garbage-collection interval that includes old-generation collection.
Figure 8B:
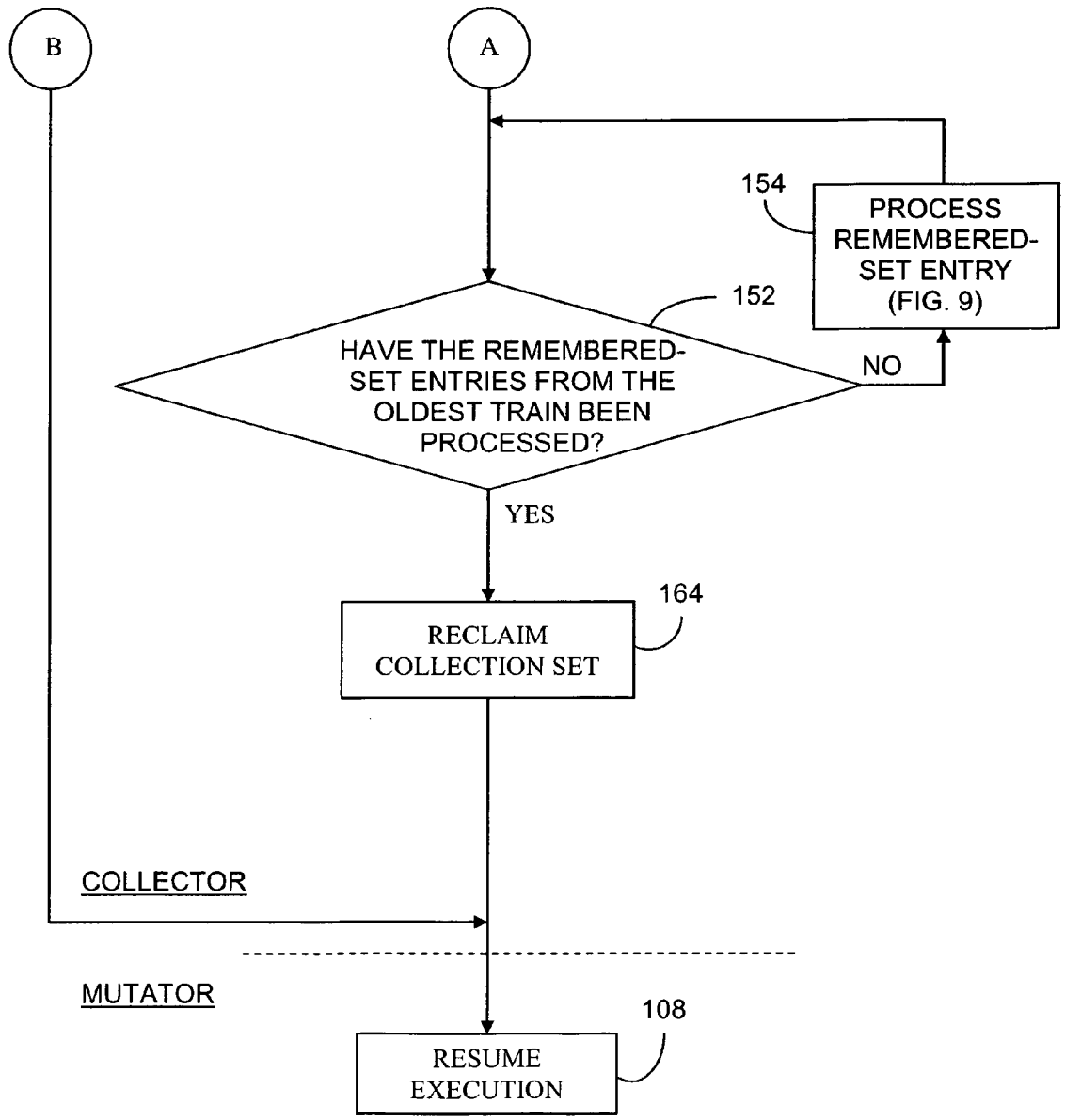
Figure 9:
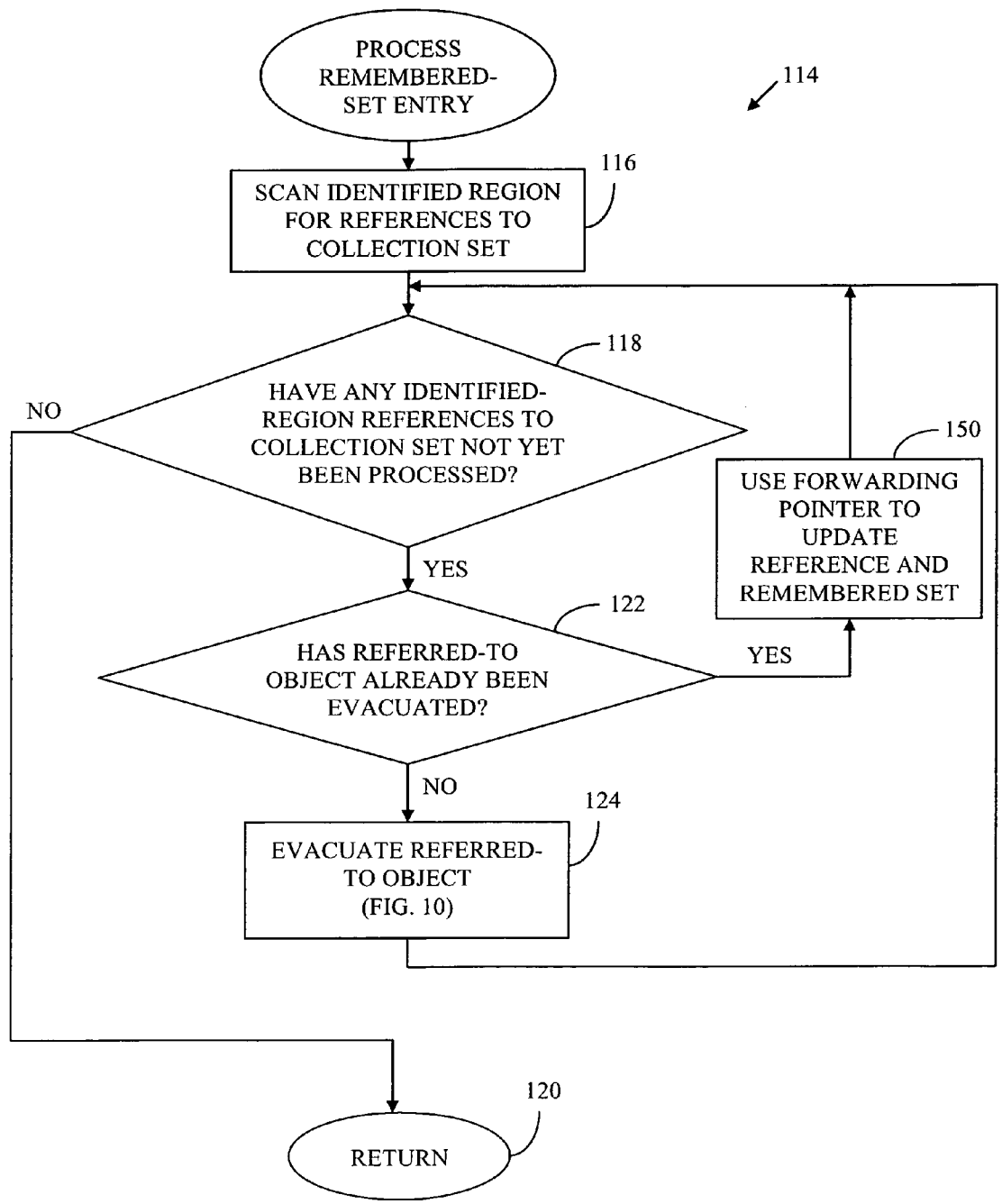
FIG. 9, discussed above, is a flow chart that illustrates in more detail the remembered-set processing included in FIG. 8A.
Figure 10:
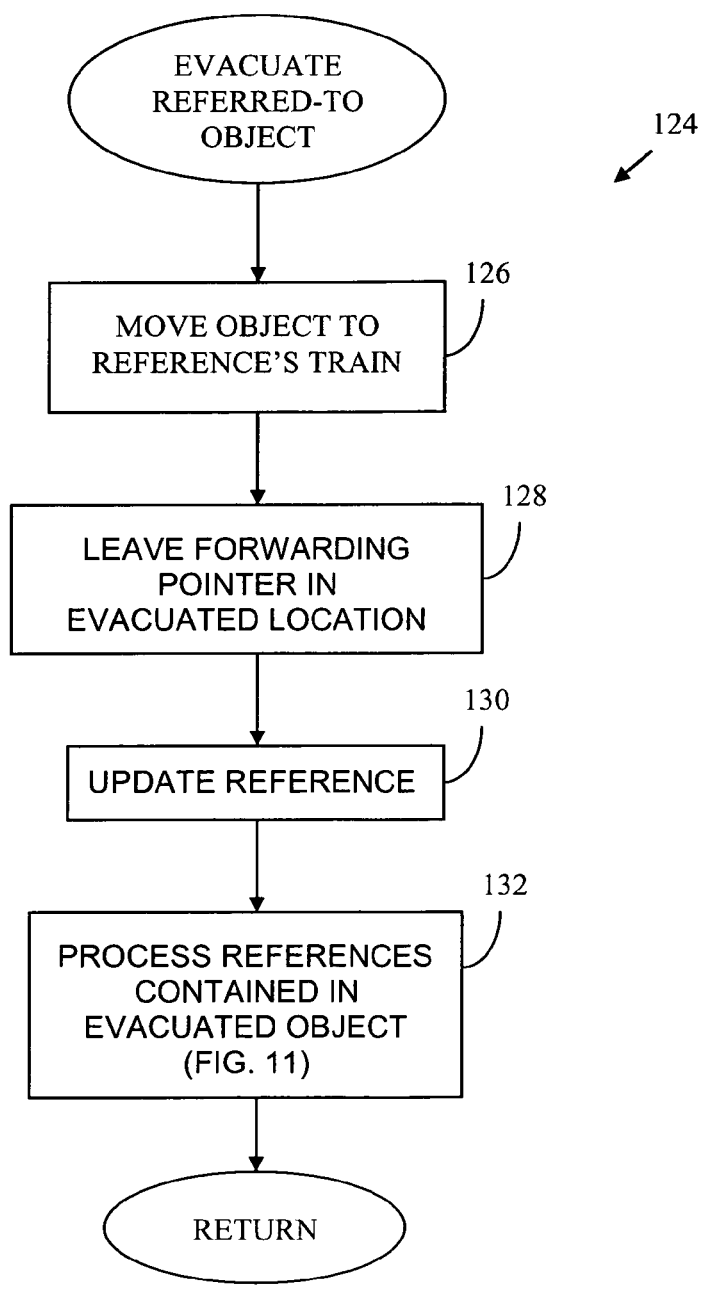
FIG. 10, discussed above, is a block diagram that illustrates in more detail the referred-to-object evacuation that FIG. 9 includes.
Figure 11A:
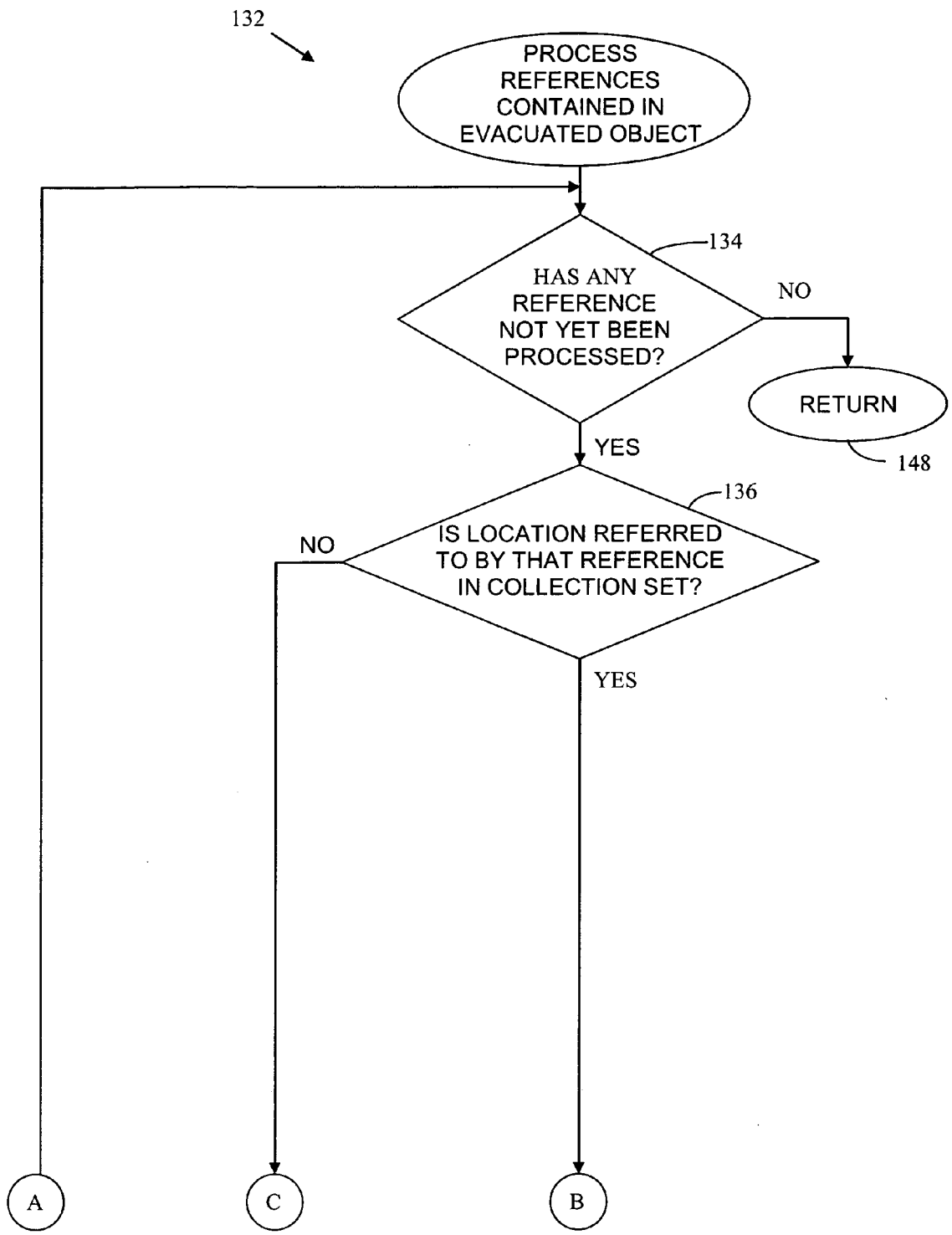
FIGS. 11A and 11B, discussed above, together form a flow chart that illustrates in more detail the FIG. 10 flow chart's step of processing evacuated objects' references.
Figure 11B:
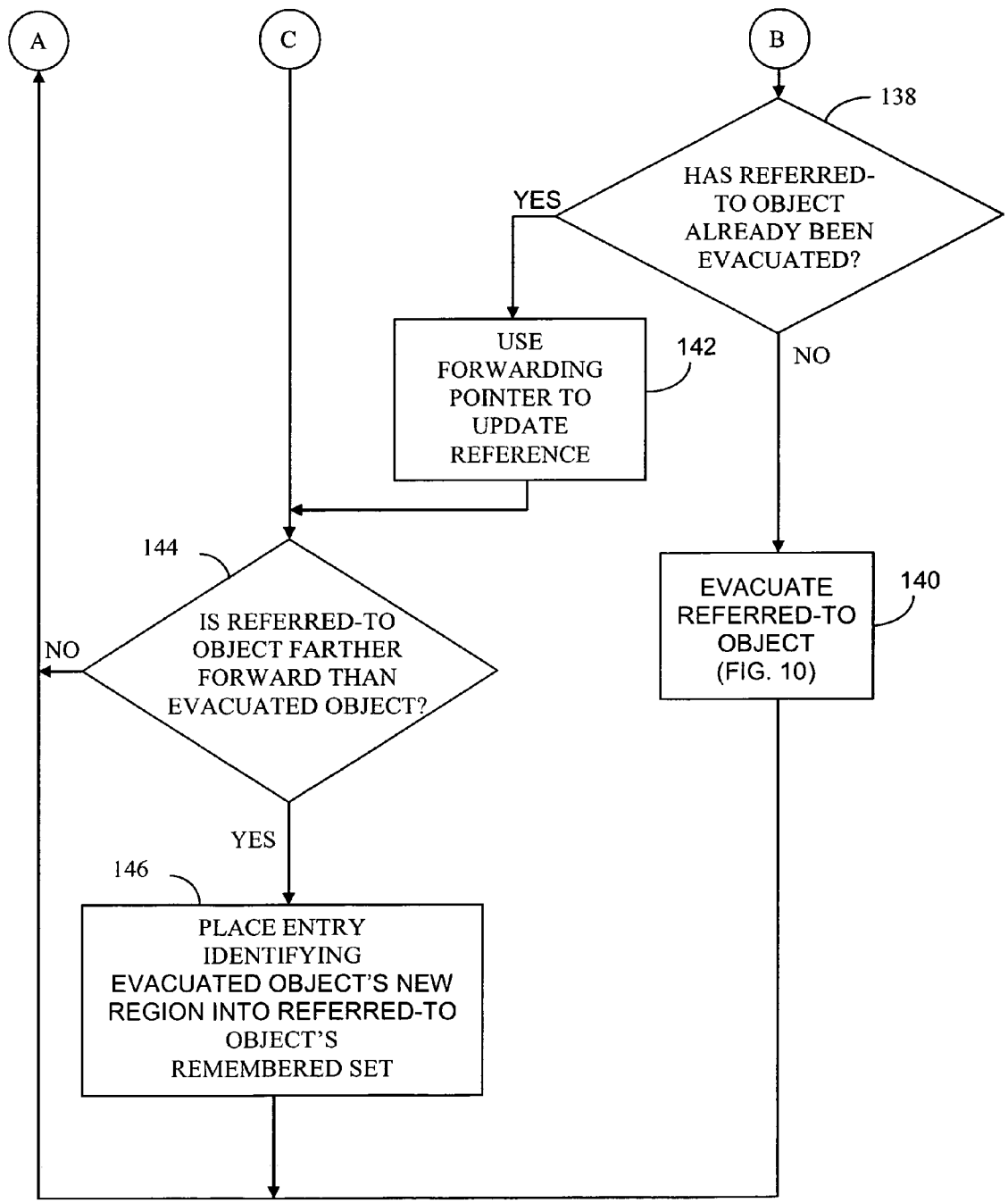
Figure 12A:
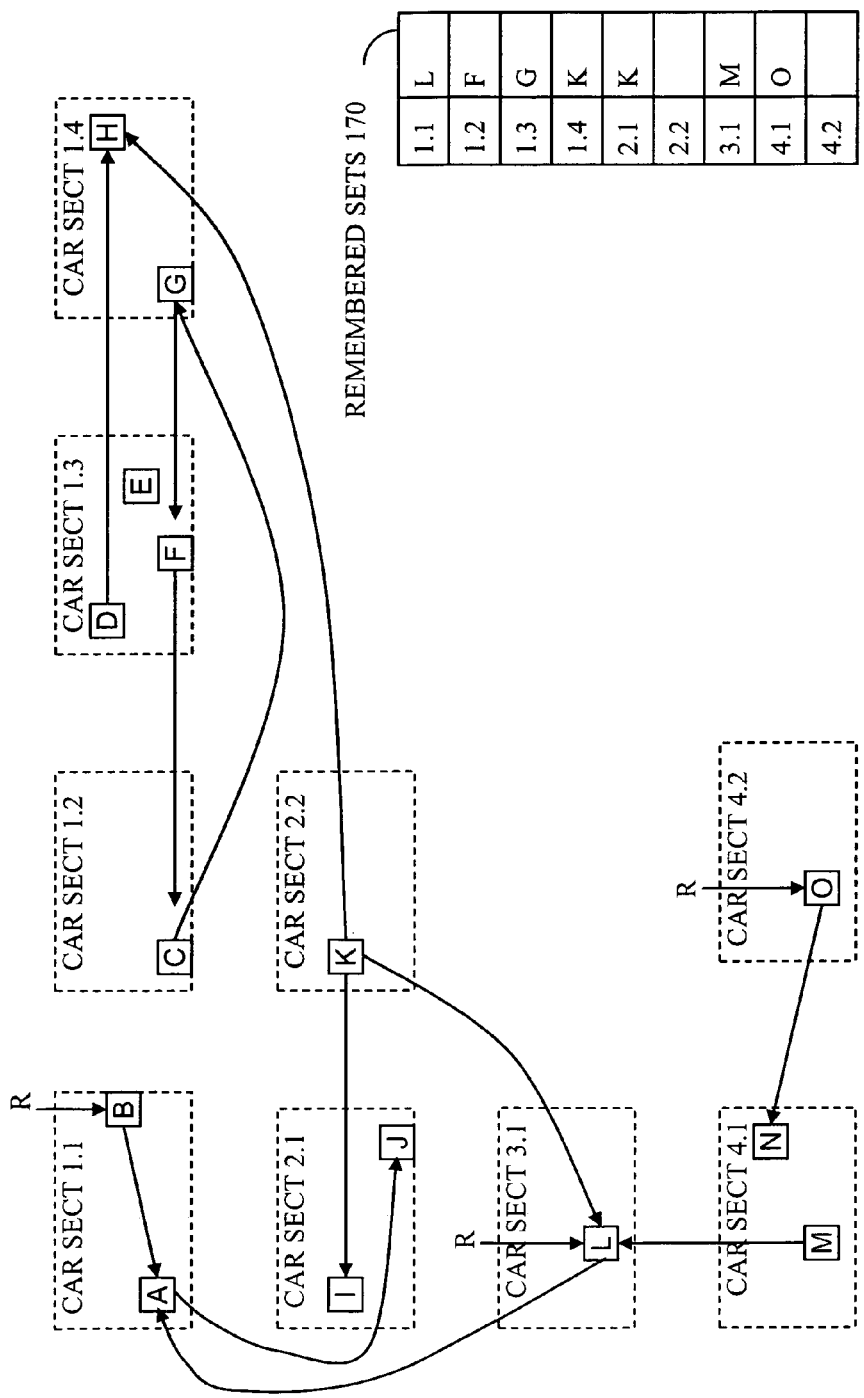
Figure 12B:
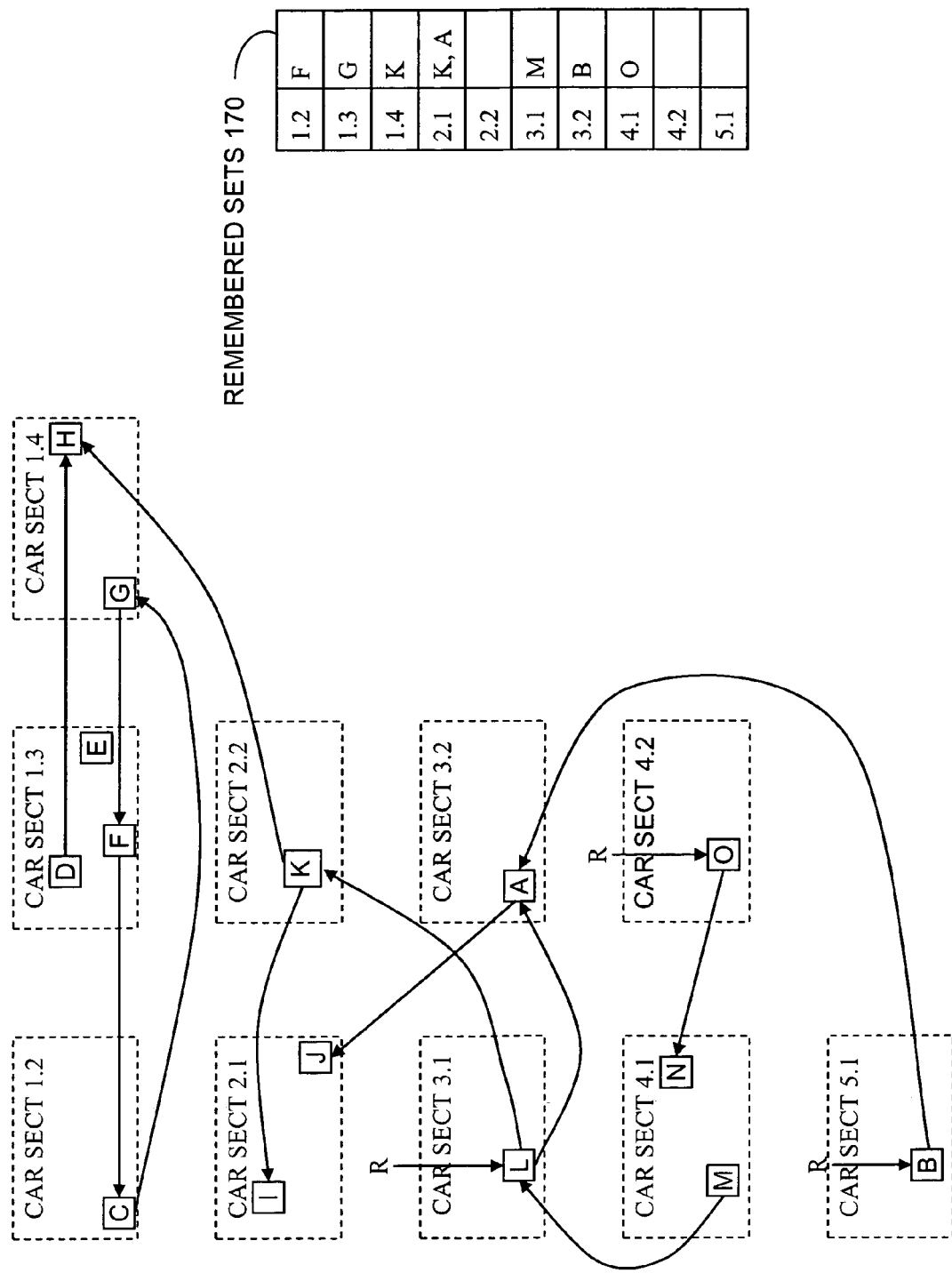
Figure 12C:
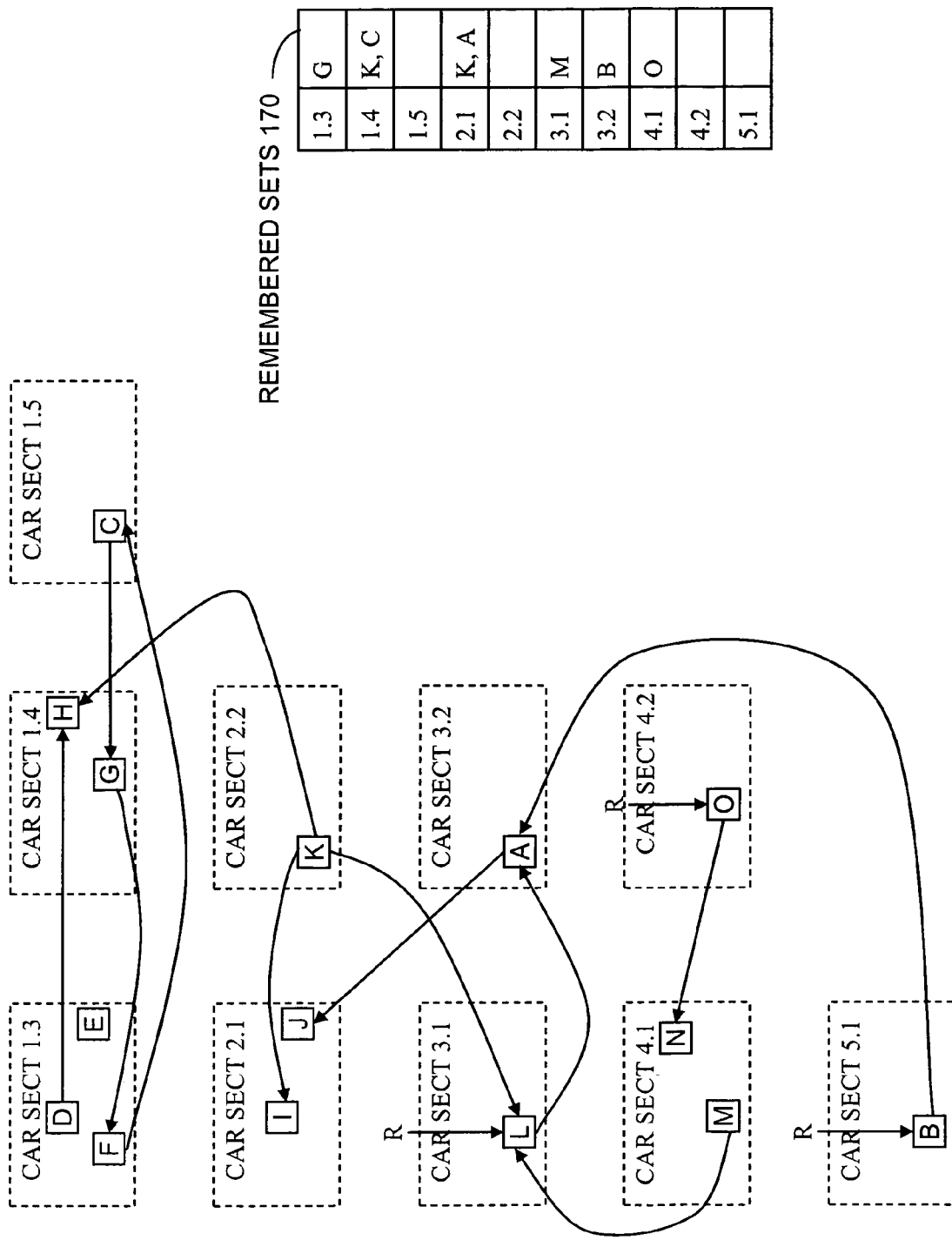
Figure 12D:
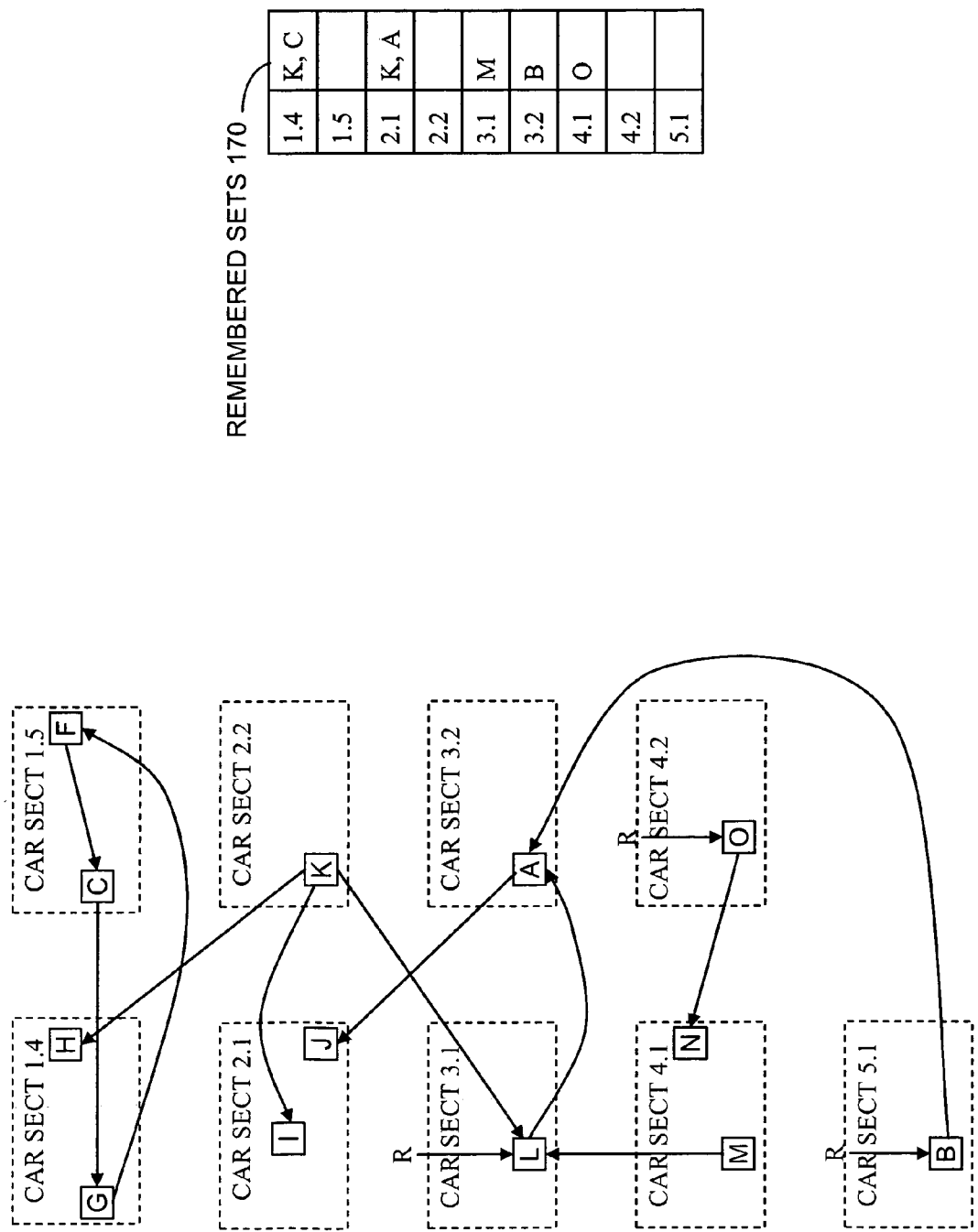
Figure 12E:
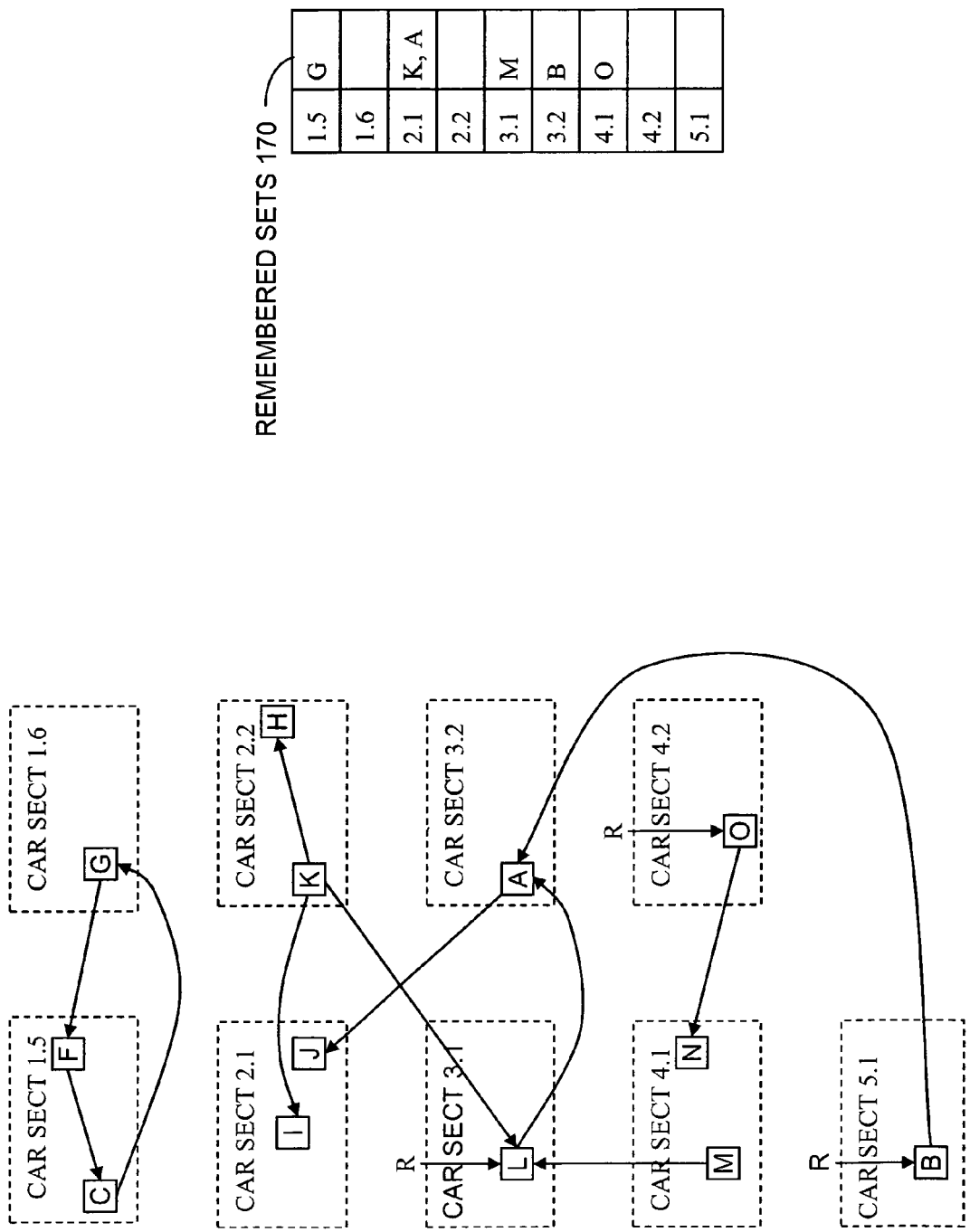
Figure 12F:
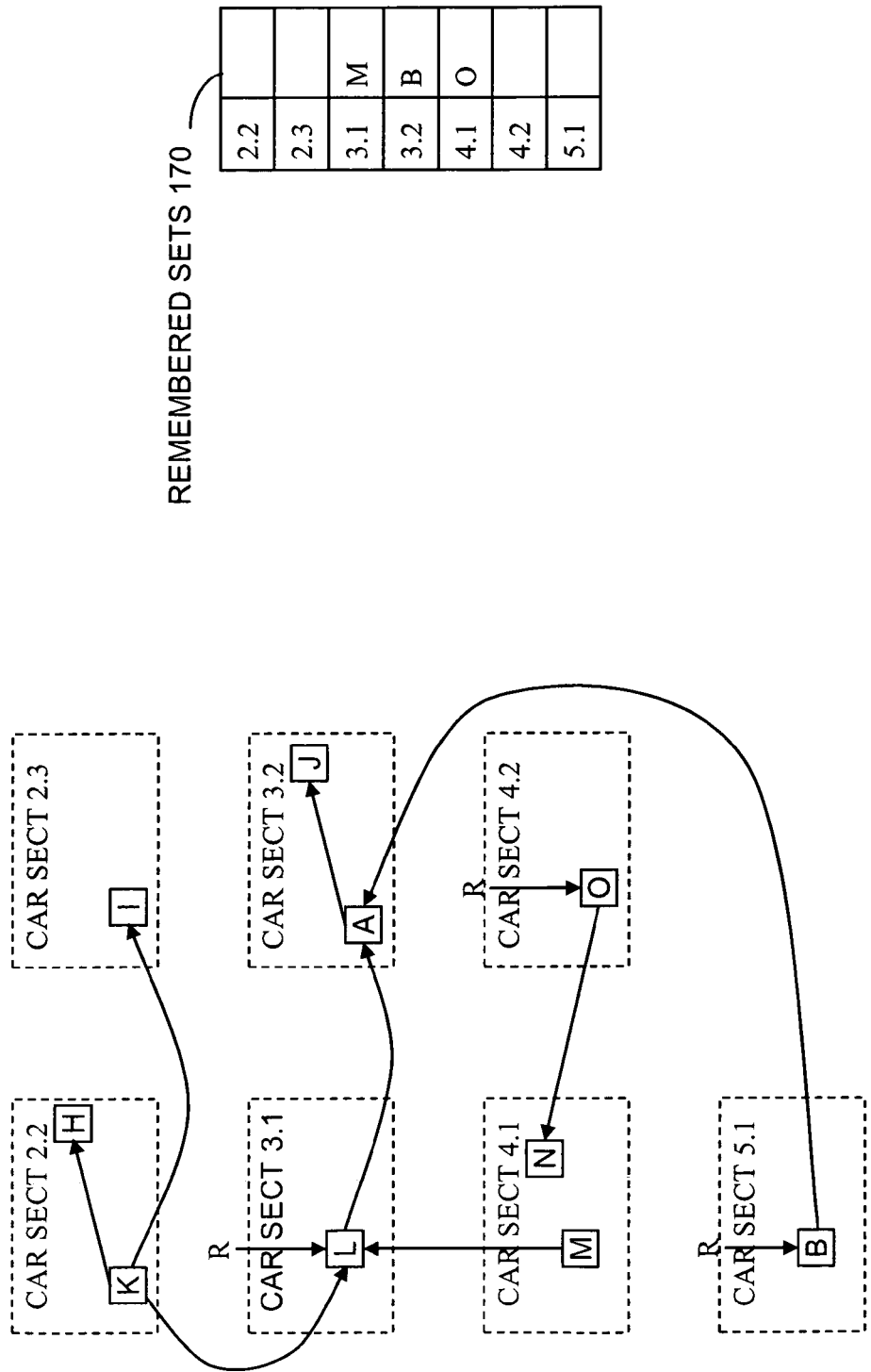
Figure 12I:
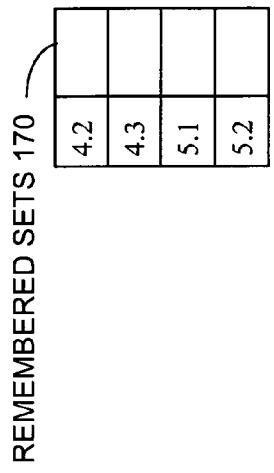
Figure 12I:
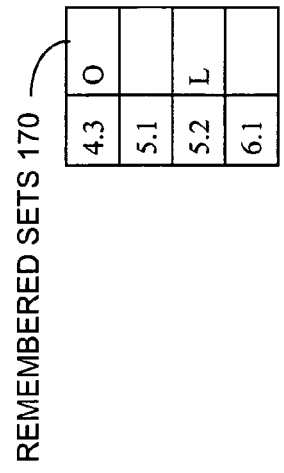
Figure 12I:
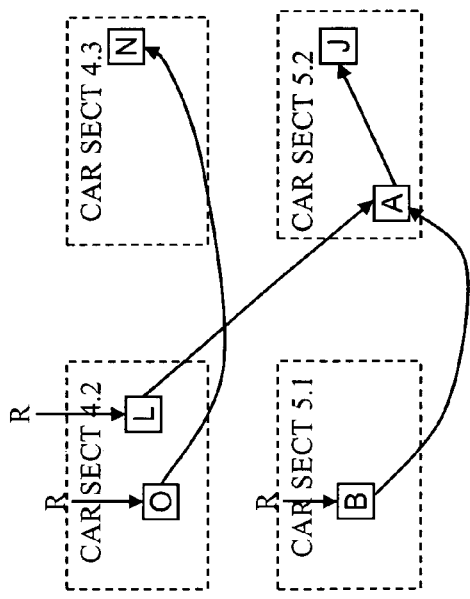
Figure 12J:
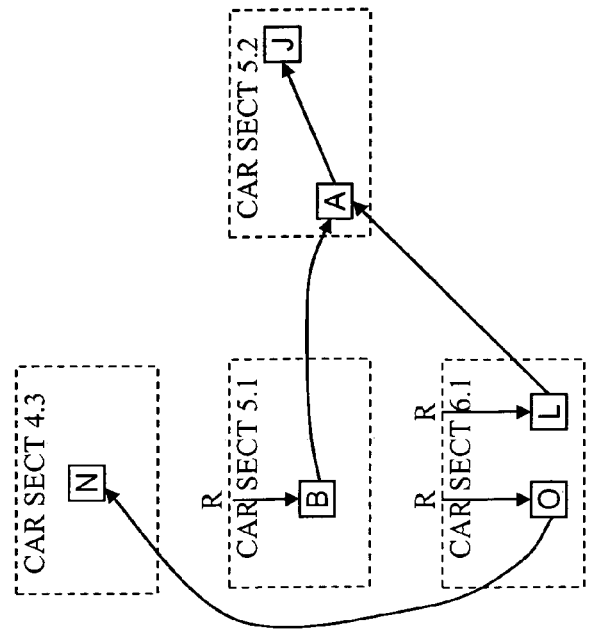

Blocks 172, 176, and 178 represent operations that correspond to those that FIG. 8's blocks 102, 106, and 108 do, and dashed line 174 represents the passage of control from the mutator to the collector, as FIG. 8's dashed line 104 does. For the sake of efficiency, though, the collection operation of FIG. 13 includes a step represented by block 180. In this step, the collector needs to determine the collection-set size, but we will postpone the discussion of that determination until after the overview of FIG. 13's incremental collection is finished. With that determination made, the collector reads the remembered set of each car in the collection set to determine the location of each reference into the collection set from a car outside of it, it places the address of each reference thereby found into a scratch-pad list associated with the train that contains that reference, and it places the scratch-pad lists in reverse-train order. Block 180 represents all those operations. As blocks 182 and 184 indicate, the collector then processes the entries in all scratch-pad lists but the one associated with the oldest train.

Before the collector processes references in that train's scratch-pad list, the collector evacuates any objects referred to from outside the old generation, as block 186 indicates. To identify such objects, the collector scans the root set. In some generational collectors, it may also have to scan other generations for references into the collection set. For the sake of example, though, we have assumed the particularly common scheme in which a generation's collection in a given interval is always preceded by complete collection of every (in this case, only one) younger generation in the same interval. If, in addition, the collector's promotion policy is to promote all surviving younger-generation objects into older generations, it is necessary only to scan older generations, of which there are none in the example; i.e., some embodiments may not require that any other generation be scanned in the block-186 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train each collection-set object to which a reference in the thus-evacuated object refers. In any case, the collector updates the reference to the evacuated object.

When the inter-generational references into the generation have thus been processed, the garbage collector determines whether there are any references into the oldest train from outside that train. If not, the entire train can be reclaimed, as blocks 188 and 190 indicate.

As block 192 indicates, the collector interval typically ends when a train has thus been collected. If the oldest train cannot be collected in this manner, though, the collector proceeds to evacuate any collection-set objects referred to by references whose locations the oldest train's scratch-pad list includes, as blocks 194 and 196 indicate. It removes them to younger cars in the oldest train, again updating references, avoiding duplicate evacuations, and evacuating any collection-set objects to which the evacuated objects refer. When this process has been completed, the collection set can be reclaimed, as block 198 indicates, since no remaining object is referred to from outside the collection set: any remaining collection-set object is unreachable. The collector then relinquishes control to the mutator.

Having reviewed the sequence of operations employed to collect a single collection set, we now turn to the manner in which the minimum collection-set size for any given incremental collection is determined. The number of cars that will be determined is only a minimum. As was noted above, a whole train's worth of cars may be reclaimed, even in a collection increment in which reachable objects have been culled from only a much smaller number of cars. Also, as is described in my commonly assigned co-pending U.S. Patent Application for Detection of Dead Regions during Incremental Collection, which was filed on the same date as the present application and is hereby incorporated by reference, additional cars may be added to the collection set if they can be recognized as containing only garbage without being culled for reachable objects. But those additions depend on the particular set of references encountered when the collection increment occurs. The method to be described, on the other hand, determines a collection increment's minimum amount of collection.

As was explained above, the collection-set size is based on the rate of allocation in the incrementally collected generation, in this case, the old generation. Preferably, the allocations upon which the collection-set-size determinations are made include not only allocations resulting from promotions from the young generation but also any direct allocations that may occur. Although two-generational collectors typically perform most initial object allocation in the young generation, many also bypass the young generation under special circumstances and allocate objects directly into the old generation. This may happen, for instance, if the object is especially large. The young generation is typically much smaller than the old generation, and an extremely large object may not even fit in it. Even if it does fit, the possibility of thereafter having to copy a very large object into the old generation if it meets promotion criterion may cause the collector to allocate such objects directly into the old generation to begin with. The illustrated embodiment monitors such direct allocations in addition to the typically more-common promotion-triggered allocations.

Figure 14:
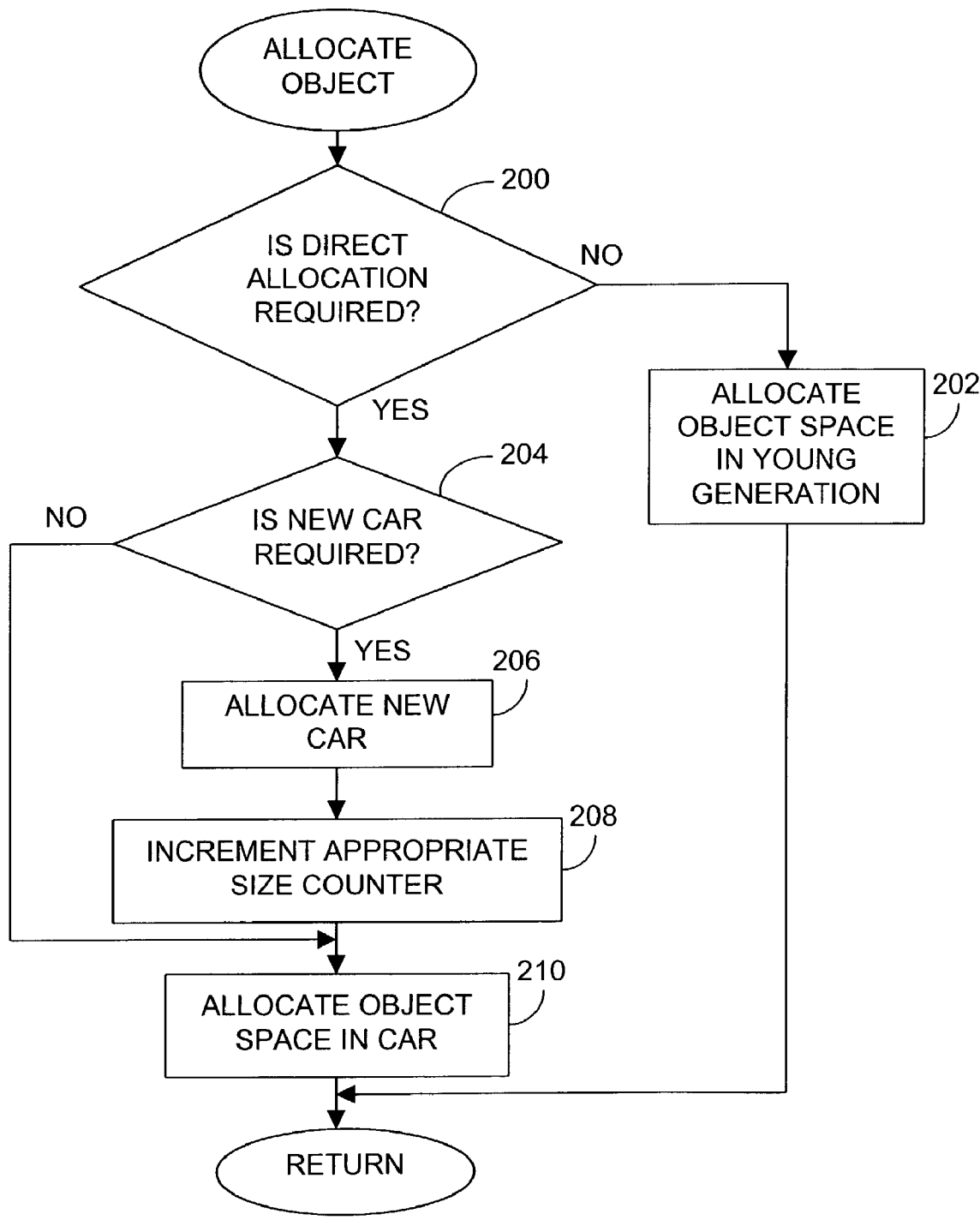
FIG. 14 is a simplified block diagram that illustrates operations involved in allocating space in the old generation.

The particular way in which a collector monitors such allocations is not critical to obtaining the present invention's advantages. But FIG. 14 is a flow chart that depicts in simplified form an example allocation routine that includes steps for allocation-rate monitoring. Block 200 represents determining which generation to allocate the object into. Actually, that block is somewhat conceptual; typically there are a number of allocation routines, and the decision represented by block 200 will often be made implicitly by the selection of routine. Some routines are the ones that the mutator calls, and others are called by the garbage collector in the process of responding to a promotion decision. In the latter case, the decision has implicitly been made already to allocate the object into the old generation. In the former case, although the routine that the mutator calls may indeed include making a decision such as the one that block 200 represents, it may instead be a routine to which the mutator is directed by the object's class structures, in which case the determination of whether to allocate the object into the young generation or into the old generation is again made implicitly, this time by selecting which class to instantiate. Independently of whether new-car allocation was necessary, space for the new object is allocated in the current car, as block 21 indicates, and the allocation routine returns.

In any event, most initial object allocations do not involve the old generation. As block 202 indicates, such allocations simply result in the object's being allocated in the young generation. When an object is to be allocated in the old generation, on the other hand—whether because it is being promoted or because it is being allocated directly—the object needs to be placed into a car. The car is usually one that has already been allocated and contains at least one other object. If the last-allocated car runs out of space, though, a new car is allocated, as blocks 204 and 206 indicate. If this happens, the routine increments a counter that represents the number of bytes allocated-since the last collection increment, as block 208 indicates. That is, it adds to that counter the number of bytes that the just-completed car contains. That number can be inferred, for example, from that car's free pointer. Independently of whether new-car allocation was necessary, space for the new object is allocated in the current car, as block 210 indicates, and the allocation routine returns.

As was mentioned above, the particular way in which the collector monitors allocation rate is not critical. For example, monitoring steps need not be included in every allocation operation, as they are in the FIG. 14 allocation routine. While it may be considered desirable to use the approach of FIG. 14 to keep track of direct allocation into the old generation, for instance, keeping track of allocations due to promotions may be better implemented by simply comparing the cars' collective occupancy before a young-generation collection with their occupancy after it.

When the next old-generation collection increment arrives, the counter's value tells how much allocation has occurred in the old generation since the previous increment. There may be some embodiments of the present invention that base a collection set's size on that amount alone. I prefer not to adopt such an approach, though, because it tends to make the collection-set size "bursty." Instead, I average the amount of allocation over a number of previous inter-collection-increment intervals.

Figure 15:
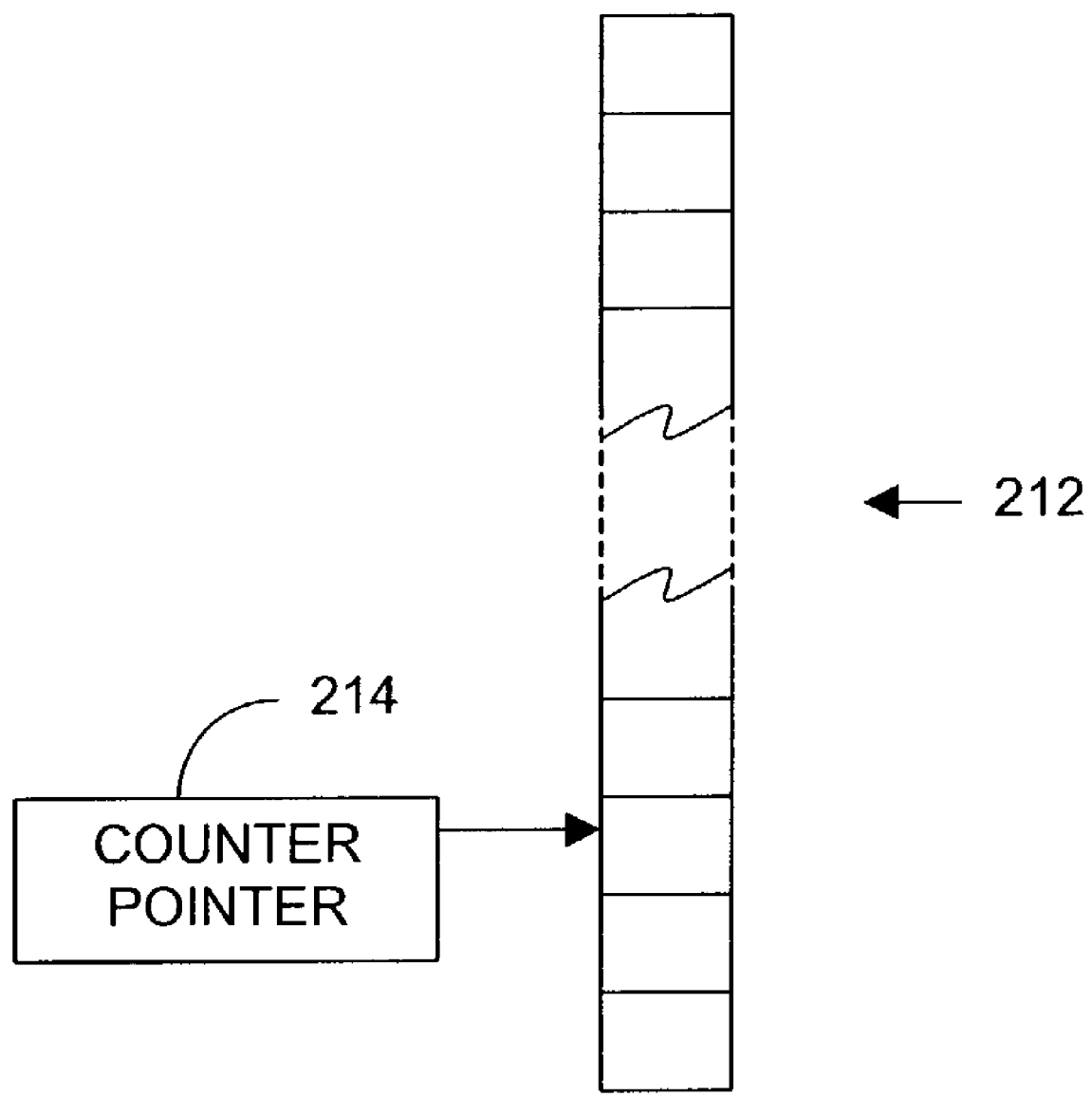
FIG. 15 is a diagram that illustrates a counter array used in determining the average rate of allocation in the old generation.

As FIG. 15 illustrates, one can employ a counter array 212 for this purpose. Each entry in that array contains a count representing the number of bytes allocated during a different inter-collection-increment interval. A counter pointer 214 identifies the array slot that contains the current interval's count. The value in that slot is the one that is incremented in the step that FIG. 14's block 208 represents. At the end of each old-generation collection increment, the counter pointer's value is changed to point to the next slot in the array. This occurs circularly: if the current slot is the bottom slot, then the pointer is changed to point to the top slot. Additionally, the contents of the newly pointed-to slot are cleared to indicate that no new cars have yet been allocated during the inter-collection-increment interval that has just started. The value that prevails in that slot at the beginning of the next old-generation collection increment is averaged with the values in all of the other slots to produce the allocation-rate value used to determine that increment's collection-set size. That average may be a straight average or, say, an average weighted to emphasize more-recent values.

Figure 16:
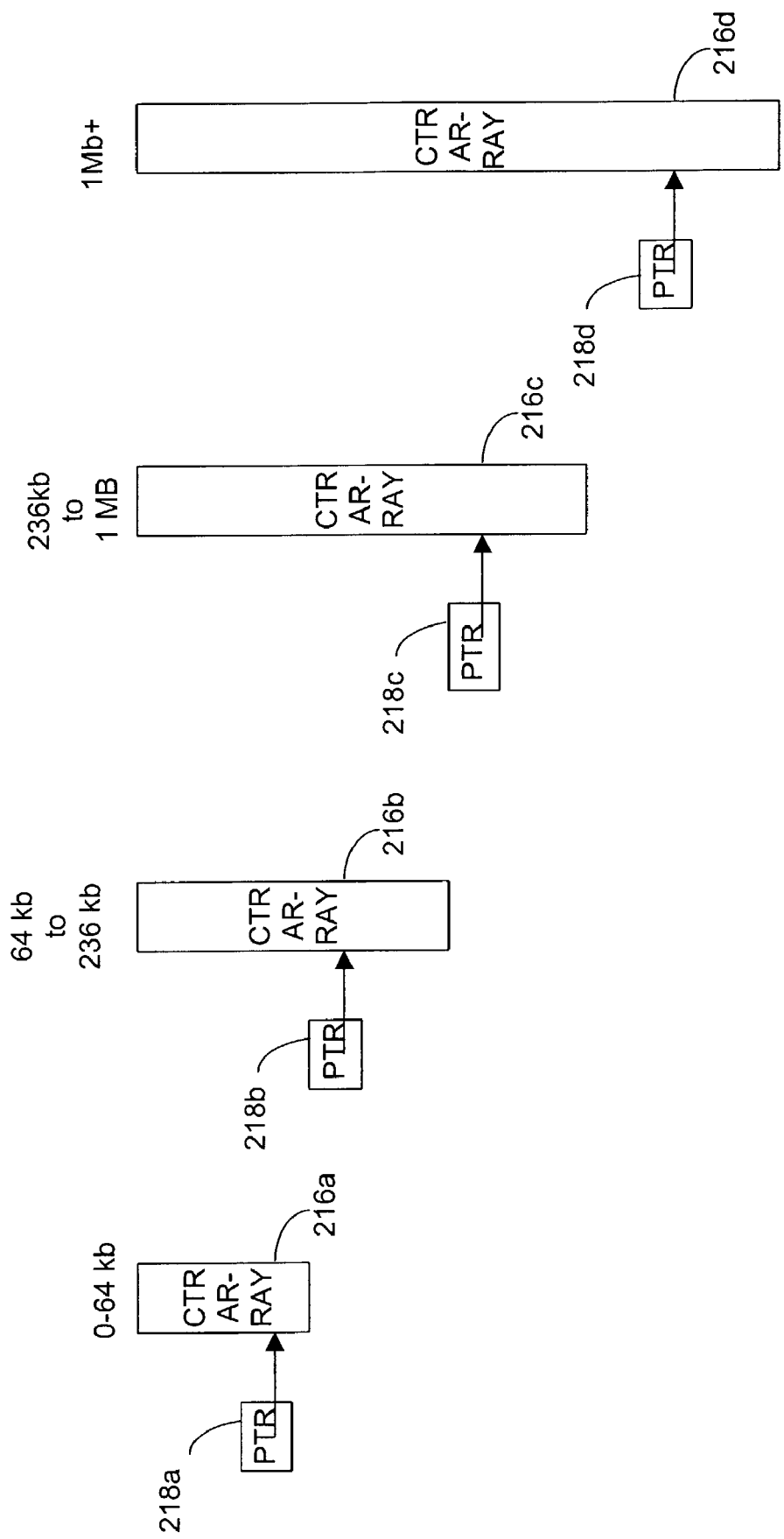
FIG. 16 is a similar diagram depicting a plurality of such arrays.

As was explained above, the averaging is performed to avoid the wide variations in collection-set size in which typically bursty object allocation could result. The greater the size of the array, the more the allocation rate's bursty nature will be suppressed. Suppressing that bursty nature adequately in the face of a mutator that calls for allocation of truly enormous objects at widely isolated times, though, may require an array size so great as to detract undesirably from the collection-set size's responsiveness to allocation rate. To achieve a compromise between smoothing and responsiveness, one can adopt an approach that FIG. 16 illustrates.

That approach employs a plurality of different-sized arrays 216a–d together with respective pointers 218a–d. The smallest array 216a may have only, say, thirty-two slots, and the slot that its associated pointer identifies is the one that is incremented whenever allocation of an object requires allocation of only a regular-sized car. Some objects are too large for such a car, though. Such objects require oversized cars. The current counter in array 216a is incremented (by a larger number of bytes) for such cars, too, if they are no larger than, say, 64 kilobytes. If the number of cars allocated at one time requires between 64 kilobytes and 256 kilobytes, on the other hand, a counter in array 216b is incremented. A counter in array 216c is incremented for allocations between 256 kilobytes and 1 megabyte, and allocations in excess of 1 megabyte cause a counter in an array 216d to be incremented. By taking a weighted average of the different arrays' totals, the collector can remain responsive to changes in the rate at which most allocations occur but appropriately smooth the contributions from isolated large-object allocations.

Of course, other averaging techniques could be employed instead to arrive at an allocation-rate value. One could dispense with the use of arrays entirely by using exponential averages, for example, and such an approach may work reasonably well. I prefer the array approach, though, because it appears to provide an appropriate degree of responsiveness without resulting in an undue sensitivity to the most-recent value.

Once a value has been determined for the average amount of old-generation allocation that occurs between old-generation collection increments, the collector calculates a desired initial collection-set size from it. The most-straightforward way of arriving at an initial collection-set size is merely to multiply the average allocation rate by some coefficient:

$$G = CB \tag{1}$$

where G is the goal, in bytes, for the collection-set cars' total object space; C is a proportionality coefficient, and B is the average number of bytes allocated in the old generation between old-generation-collection increments. With the goal thus determined, cars are added to the collection set until the total number of object bytes in each car equals or exceeds the goal. The total number of object bytes is readily determined from each car's free pointer, which tells where the next object, if any, should be added to that car. The cars thus selected are culled of reachable objects, if necessary, to enable their space to be reclaimed. (Again, cars that can be reclaimed without culling may be added to the initial collection whose number this calculation determines.)

Although the amount reclaimed in a collection increment can be greater than the initial collection-set size, this happens only infrequently, so the value of C should be greater than unity. Suppose, for example, that a fraction s' of the bytes in a collection set are expected to survive on the average. That means that the average amount reclaimed will be (1–s') G. The goal is that the amount reclaimed should, on a steady-state basis, equal the amount allocated, so the proportionality coefficient C is related to the survival rate in the following manner.

$$C = \frac{1}{1 - s'} \tag{2}$$

Of course, the survival rate varies from application to application and from time to time within the same application, so many embodiments will monitor the survival rate and adapt the proportionality coefficient to it. Survival rate is readily determined from the fact that any objects added to cars during an old-generation collection increment are objects that survived that collection increment.

Suppose, for example, that at the beginning of a collection a given train contains four cars and that the value of the fourth car's free pointer at that time shows that objects occupy 800 bytes in that car. Suppose further that, at the end of the collection increment, that train has six cars and that the fourth, fifth, and sixth cars' free pointers show that objects occupy 900, 700, and 200 bytes, respectively, at that time. Then that train has received 900–800+700+200=1000 bytes of surviving objects. Similar calculations for all other trains yield the total survival amount, and the ratio of this value to the total number of bytes that collection-set objects occupied at the beginning of the collection increment gives the survival rate. Preferably, the rate for a given increment is averaged in some fashion with the rates for previous increments to arrive at a recent survival rate s.

This value could be substituted in equation (2) to produce the proportionality coefficient. However, because that calculation involves a subtraction in the numerator and s may approach unity in some increments, the resultant collection-set size could end up being impracticably large. Of course, averaging the survival rates over a large number of old-generation collection increments will tend to reduce that danger, but taking the average over too many increments may prevent the collection-set-size calculation from being responsive enough to the survival rate.

I therefore prefer a calculation approach that retains some measure of responsiveness but eliminates the possibility of excessively high proportionality values. This approach is based on recognizing that, if the monitored survival rate s replaces the expected survival rate s' in equation (2), the Taylor-series expansion of that equation becomes $$C = 1 + \sum_{k=1}^{\infty} s^k \qquad (3)$$

By truncating that series and substituting the result into equation (1), we obtain $$G=(1+s)B \qquad (4)$$

That calculation is not susceptible to the exceedingly large values that can result from subtraction in a numerator. Since it does result from truncating the Taylor series, though, it will tend to undershoot the desired collection-set size, so I employ a constant K to make the undershoot less likely:

$$G=KB(1+s) \qquad (5)$$

K's value is chosen to reverse the expected undershoot. That is, if s' is the expected survival rate, then the value for K that results from taking the reciprocal of the undershoot ratio is given by:

$$K = \frac{1}{\frac{1-s'}{1+s'}} = \frac{1}{1-s'^2} \qquad (6)$$

The expected survival rate is treated as a fixed quantity in the above discussion, and embodiments that compute their target collection-set sizes in accordance with those equations may indeed employ a fixed value; a value of about 0.6, for example, seems to work well for a wide variety of applications. But other embodiments may update s' by averaging over a longer period of time the same data they use to update s. To avoid storing excessively long records for this purpose, embodiments that take this approach may use an exponential average.

The collection-set size can additionally be made dependent on other run-time quantities. In the case of a collector that employs the train algorithm, for instance, one may attempt to take into account some measure of how effectively the collector is currently grouping garbage structures together. A metric that can be helpful in this context is the "distance" by which evacuated objects are moved. As was explained above, the train ordering and the ordering of cars within trains impose an overall order on the generation's cars. When an object is evacuated, it may be evacuated all the way back to the end of that sequence: it may be moved a relatively large distance. If it ends up near the front of the sequence, on the other hand, the distance it has moved is relatively small.

One way to arrive at a normalized distance value involves numbering the cars in accordance with their sequence positions, the car farthest to the rear being given the highest number. The number of bytes of objects evacuated to a given car during the collection increment is multiplied by that car's sequence number, and the results for all cars are added together and divided by the product of the highest sequence number and the total number of evacuated-object bytes. An alternative to using car-sequence numbers as multipliers is to use the number of bytes of object storage contained by cars that precede the locations to which objects are evacuated. Although this approach adds more complexity, it also yields greater accuracy, since not all cars contain the same object volume. The resultant value δ is an indicator of how far on average evacuated objects have been moved. As is the case with the other quantities, the distance value used in the calculation may actually be the result of averaging distance values over a number of previous increments.

Observation of train-algorithm operation reveals that short evacuation distances tend to be symptomatic of a local topology that requires a relatively large amount of work to group a data structure properly. An example occurs when the oldest train includes a lot of references from its younger cars to its older cars but the only references into the train from outside of it are (initially) located in its youngest car. In such a situation, it takes a lot of short-distance evacuations to collect the cars at the beginning of the train, and it is only after collection reaches what had been the end of the train that either the train becomes garbage or the objects that it contains get removed to younger trains. In such a situation, it is desirable to increase the collection rate so as to pass quickly through the part where there is a lot of "straightening," i.e., a lot of placing referred-to objects behind the references to them. A shorter distance value should therefore result in a greater goal value, so one may employ a function such as the following:

$$G=KB(1+s)(2-\delta) \qquad (7)$$

Although I have employed that function, I have found that distance effects are most pronounced at short distances, so squaring 1−δ yields an improvement. Instead of substituting $(1-\delta)^2$ for 1−δ in equation (7), though, I have used the following function:

$$G=KB[1+s+s(1-\delta)^2], \qquad (8)$$

effectively making the distance factor's contribution depend on the object volume that moved the measured distance.

The tests that I have performed by using that function have yielded collection-set sizes that desirably cause the rate of reclamation to converge to the rate of allocation and thus enable the collector to operate for extensive periods in the incremental mode without resorting to full collections. But embodiments of the present invention may add further refinements. For example, one may want to increase the collection rate if the proportion of remembered sets exceeding some threshold size is relatively large, so the function can additionally include some metric reflecting that factor. A factor reflecting the amount of free space in the heap may also be included; the goal collection-set size for a given allocation rate may be made to increase if the amount of free space has fallen to a relatively low level. In short, there are many ways that can be used to base collection-set size on the rate of allocation in the generation being incrementally collected.

Much of this approach's advantages in the context of a train-algorithm-based collector results from its implementing multiple-car collection sets. To appreciate some of these advantages, it is important to recognize that, although this technique itself is used to arrive at a collection-set size, it may actually be used in practice as a way to determine other parameters after a desired collection-set size has been determined.

For example, it may be considered desirable to employ the maximum collection-set size that is consistent with some predetermined pause-time limits. If the collection-set size determined in accordance with the above-described technique from the old-generation allocation rate is significantly below the maximum collection-set size that allowed pause times will permit, the collector may increase the amount of time between the old (or other incrementally collected) generation's collection increments.

Thus increasing the time between collection increments improves collection efficiency, because it gives objects more time to die. It also yields economies of scale, since it enables the collector to amortize over a relatively large amount of collection those costs of a collection increment that are relatively independent of how much collection that increment performs. An example of such a cost is that of requiring the operating system to suspend all of the program's mutator threads. These costs can be significant, but they are essentially the same for, say, a ten-car collection as they are for a single-car collection. Similarly, the cost of scanning all roots for references into the collection set is not significantly greater for a large collection set then for a small one. So garbage collection's overall cost can be reduced significantly by making collection sets as large as pause-time limits permit.

The multiple-car aspect of the collection set can additionally yield memory savings. Suppose, for example, that every collection set consisted of only a single car and that cars were therefore so sized as to result in a collection-increment duration that is just below the maximum tolerable duration. Since car sections are the increments by which trains grow, employing the resultant large car-section size could tend to waste space; as the number of trains becomes large, the space wasted in partially filled cars can become significant.

Using multiple-car collection sets can also reduce evacuation cost. As was mentioned above, a collection-set object that a reference outside the collection set refers to must be evacuated into the train to which the object containing that reference belongs. But the evacuation can be avoided if the car containing the reference is in the collection set, too. Having more cars in the collection set therefore tends to reduce the number of evacuations and thus the overall collection cost.

Finally, employing multiple-car collection sets facilitates use of a popular-object-handling approach described in my U.S. Pat. No. 6,434,576 for Popular-Object Handling in a Train-Algorithm-Based Garbage Collector. That application describes a convenient run-time mechanism for assigning objects to their own, single-object cars and for making those cars' sizes significantly smaller than normal-car sizes. This is beneficial for "popular" objects, i.e., for objects to which many references refer. The need to update all of the references to them ordinarily makes evacuating popular objects onerous. But that cost can be avoided if each popular object is in a respective (typically small) single-object car. In that case, the car's membership can be changed by simply re-linking the car, so no reference updating is needed. By using multiple-car collection sets, one can perform a relatively large amount of collection in an interval even though individual cars are small.

But the present invention's advantages extend beyond the fact that it supports multiple-car collection sets when it is employed in the train algorithm. Principal among these is the accuracy that results from basing the collection-set size on the total rate of old-generation allocation.

To appreciate this, consider the previously described prior-art approach of basing the frequency of old-generation collection on how productive an old-generation collection is at reclaiming garbage-containing memory space. The rationale for that approach is that the overall frequency of (mostly young-generation) collections is already based on the rate at which objects are allocated, and collection efficiency is, according to the rationale, beneficially affected by reducing the ratio of old-generation collections to young-generation collections if the garbage ratio has fallen. That is, if the garbage ratio is too low, the collector is not waiting long enough between old-generation-collection intervals, so objects have not had enough time to "die."

Although this rationale has a surface appeal, I have recognized that applying it can actually be counterproductive. In practice, the train algorithm tends to "clump" long-lived objects into the same trains. As the old-generation collection encounters such sequences of long-lived objects, it observes a low rate of garbage recovery. In accordance with that prior-art technique's rationale, the frequency of old-generation-collection intervals is too high to allow enough objects time to die. In fact, though, the frequency should be higher so that the collector moves more quickly through the long-lived objects to reach ones that are likely to be garbage and whose collection can thus free up the memory needed for further allocation. So thus basing the old-generation-collection rate only on garbage ratio can actually tend to impede necessary memory-space reclamation.

Now, not all prior workers rejected the concept of basing the old-generation-collection rate on allocation into the old generation. As was explained above, the HotSpot collector varied both the young-generation size and the number of young-generation collection intervals between old-generation-collection intervals in accordance with promotions into the old generation. But that did not afford the advantages that result from using collection-set-size changes as the way to varying collection rate. By choosing old-generation-collection frequency rather than collection-set size as the way in which to vary collection rate, that prior-art approach can cause a vicious cycle, because a relatively large amount of promotion during a young-generation collection tends to increase the frequency with which old-generation-collection cycles occur. This gives the young generation's occupants less time to die and therefore causes an increase in promotion rate, which in turn causes a further increase in the frequency of old-generation collection cycles. As a consequence, collection efficiency decreases: less memory space is collected for a given amount of collection. And this effect tends to feed upon itself. The present invention's approach of instead varying collection-set size provides a way of breaking this vicious cycle; the collection rate can be increased without increasing frequency and without thereby affecting the collection operation's efficiency adversely.

Moreover, a feature of the illustrated embodiment greatly reduces the likelihood that the incremental collection will fail to keep up with the allocation and thereby trigger a disruptive complete-generation collection. Specifically, the illustrated embodiment bases its determination of the target collection rate on the total old-generation allocation rate, i.e., on the total not only of promotion but also of direct allocation into the old generation, whereas the HotSpot collector, for example, bases its collection rate only on the portion of the old-generation allocation that results from promotion, while the allocation on whose rates other previous collectors mentioned above base their rate of old-generation collection does not occur in the same generation at all. Since it is often the very largest objects that are the subjects of direct allocation, it is not at all difficult to imagine an application in which basing collection rate on promotion only—or, worse, on no allocation in the same generation at all—will fail to respond to most old-generation allocation. By basing collection-set size on the generation's total allocation rate, on the other hand, the illustrated embodiment is more likely to avoid the resultant need for disruptive full-generation collection cycles.

The present invention therefore constitutes a significant advance in the art.

What is claimed is:

1. For employing a computer system, which includes memory of which at least some is used as a heap for dynamic allocation, to perform garbage collection incrementally on an incrementally collected generation of the heap, a method comprising:
    A) monitoring the rate of allocation within the incrementally collected generation;
    B) calculating collection-set sizes from the allocation rates thus monitored; and
    C) collecting the generation in increments that employ collection sets whose minimum sizes are the collection-set sizes thus determined.

2. A method as defined in claim 1 further comprising:
    D) treating the heap as additionally including at least one younger generation, into which objects are allocated;
    E) promoting into the incrementally collected generation from the at least one younger generation objects that meet predetermined promotion criteria.

3. A method as defined in claim 2 wherein:
    F) the method further comprises allocating objects directly into the incrementally collected heap; and
    G) the monitored allocation rate includes not only the rate at which objects are promoted into the incrementally collected heap but also the rate at which they are allocated into it directly.

4. A method as defined in claim 1 wherein the calculation of collection-set sizes includes determining the allocation rate from the volumes of allocation in the incrementally collected generation that occur during intervals between increments of the incrementally collected generation's collection.

5. A method as defined in claim 4 wherein:
    D) the method further includes monitoring the rate at which objects in the generation survive collection; and
    E) the calculation of collection-set sizes includes calculating the collection-set sizes from the rate thus monitored as well as from the allocation rate.

6. A method as defined in claim 4 wherein:
    D) the method further includes monitoring the distances through which objects are evacuated during collection; and
    E) the calculation of collection-set sizes includes calculating the collection-set sizes from the distances thus monitored as well as from the allocation rate.

7. A method as defined in claim 4 wherein the calculation of a collection-set size includes determining the allocation rate from the volumes of allocation in the incrementally collected generation that occur during a plurality of previous intervals between increments of the incrementally collected generation's collection.

8. A method as defined in claim 7 further including:
    D) monitoring the rate at which objects in the generation survive collection; and
    E) the calculation of collection-set sizes includes calculating the collection-set sizes from the rate thus monitored as well as from the allocation rate.

9. A computer system comprising:
    A) processor circuitry operable to execute processor instructions; and
    B) memory circuitry, to which the processor circuitry is responsive, that contains processor instructions readable by the processor circuitry to configure it to treat at least a heap portion of the memory as a heap, in which dynamic allocation occurs, and act as a garbage collector that incrementally collects an incrementally collected generation of the heap by:
        i) monitoring the rate of allocation within the incrementally collected generation;
        ii) calculating collection-set sizes from the allocation rates thus monitored; and
        iii) collecting the generation in increments that employ collection sets whose minimum sizes are the collection-set sizes thus determined.

10. A computer system as defined in claim 9 wherein the garbage collector:
    C) treats the heap as additionally including at least one younger generation, into which objects are allocated;
    D) promotes into the incrementally collected generation from the at least one younger generation objects that meet predetermined promotion criteria.

11. A computer system as defined in claim 10 wherein:
    E) the garbage collector allocates objects directly into the incrementally collected heap; and
    F) the monitored allocation rate includes not only the rate at which objects are promoted into the incrementally collected heap but also the rate at which they are allocated into it directly.

12. A computer system as defined in claim 9 wherein the calculation of collection-set sizes includes determining the allocation rate from the volumes of allocation in the incrementally collected generation that occur during intervals between increments of the incrementally collected generation's collection.

13. A computer system as defined in claim 12 wherein:
    C) the garbage collector monitors the rate at which objects in the generation survive collection; and
    D) the calculation of collection-set sizes includes calculating the collection-set sizes from the rate thus monitored as well as from the allocation rate.

14. A computer system as defined in claim 12 wherein:
    C) the garbage collector monitors the distances through which objects are evacuated during collection; and
    D) the calculation of collection-set sizes includes calculating the collection-set sizes from the distances thus monitored as well as from the allocation rate.

15. A computer system as defined in claim 12 wherein the calculation of a collection-set size includes determining the allocation rate from the volumes of allocation in the incrementally collected generation that occur during a plurality of previous intervals between increments of the incrementally collected generation's collection.

16. A computer system as defined in claim 15 wherein:
- C) the garbage collector monitors the rate at which objects in the generation survive collection; and the calculation of collection-set sizes includes calculating the collection-set sizes from the rate thus monitored as well as from the allocation rate.

17. A storage medium containing instructions readable by a computer system that includes memory to configure the computer system to treat at least a portion of the memory as a heap, in which dynamic allocation occurs, and act as a garbage collector that incrementally collects an incrementally collected generation of the heap by:
- A) monitoring the rate of allocation within the incrementally collected generation;
- B) calculating collection-set sizes from the allocation rates thus monitored; and
- C) collecting the generation in increments that employ collection sets whose minimum sizes are the collection-set sizes thus determined.

18. A storage medium as defined in claim 17 wherein the garbage collector:
- D) treats the heap as additionally including at least one younger generation, into which objects are allocated;
- E) promotes into the incrementally collected generation from the at least one younger generation objects that meet predetermined promotion criteria.

19. A storage medium as defined in claim 18 wherein:
- F) the garbage collector allocates objects directly into the incrementally collected heap; and
- G) the monitored allocation rate includes not only the rate at which objects are promoted into the incrementally collected heap but also the rate at which they are allocated into it directly.

20. A storage medium as defined in claim 17 wherein the calculation of collection-set sizes includes determining the allocation rate from the volumes of allocation in the incrementally collected generation that occur during intervals between increments of the incrementally collected generation's collection.

21. A storage medium as defined in claim 20 wherein:
- D) the garbage collector monitors the rate at which objects in the generation survive collection; and
- E) the calculation of collection-set sizes includes calculating the collection-set sizes from the rate thus monitored as well as from the allocation rate.

22. A storage medium as defined in claim 20 wherein:
- D) the garbage collector monitors the distances through which objects are evacuated during collection; and
- E) the calculation of collection-set sizes includes calculating the collection-set sizes from the distances thus monitored as well as from the allocation rate.

23. A storage medium as defined in claim 20 wherein the calculation of a collection-set size includes determining the allocation rate from the volumes of allocation in the incrementally collected generation that occur during a plurality of previous intervals between increments of the incrementally collected generation's collection.

24. A storage medium as defined in claim 23 wherein:
- D) the garbage collector monitors the rate at which objects in the generation survive collection; and
- E) the calculation of collection-set sizes includes calculating the collection-set sizes from the rate thus monitored as well as from the allocation rate.

25. For incrementally collecting an incrementally collected generation of a heap where dynamic allocation occurs in a computer system's memory, a garbage collector including:
- A) means for monitoring the rate of allocation within the incrementally collected generation;
- B) means for calculating collection-set sizes from the allocation rates thus monitored; and
- C) means for collecting the generation in increments that employ collection sets whose minimum sizes are the collection-set sizes thus determined.

* * * * *